United States Patent [19]

Suzumoto et al.

[11] Patent Number: 5,252,454
[45] Date of Patent: * Oct. 12, 1993

[54] SILVER HALIDE PHOTOGRAPHIC MATERIAL

[75] Inventors: Takeshi Suzumoto; Takanori Hioki; Naoto Ohshima, all of Kanagawa, Japan

[73] Assignee: Fuji Photo Film Co., Ltd., Kanagawa, Japan

[*] Notice: The portion of the term of this patent subsequent to Aug. 6, 2008 has been disclaimed.

[21] Appl. No.: 710,259

[22] Filed: Jun. 4, 1991

Related U.S. Application Data

[63] Continuation of Ser. No. 259,631, Oct. 19, 1988, abandoned.

[30] Foreign Application Priority Data

Oct. 19, 1987 [JP] Japan .................. 62-263319
Mar. 31, 1988 [JP] Japan .................. 63-78465

[51] Int. Cl.$^5$ .................. G03C 1/20; G03C 1/28
[52] U.S. Cl. .................. 430/576; 430/567; 430/569; 430/572; 430/584; 430/605; 430/611
[58] Field of Search .......... 430/567, 569, 572, 573, 430/574, 575, 576, 584, 605, 611

[56] References Cited

U.S. PATENT DOCUMENTS

| | | | |
|---|---|---|---|
| 3,615,632 | 10/1971 | Shiba et al. | 96/112 |
| 3,969,116 | 7/1976 | Shiba et al. | 96/27 |
| 4,564,591 | 1/1986 | Tanaka et al. | 430/567 |
| 4,618,570 | 10/1986 | Kadowaki et al. | 430/505 |
| 4,801,524 | 1/1989 | Mifune et al. | 430/569 |
| 4,822,726 | 4/1989 | Ikeda et al. | 430/550 |
| 4,939,080 | 7/1990 | Hioki et al. | 430/576 |
| 5,015,563 | 5/1991 | Ohya et al. | 430/546 |
| 5,037,733 | 8/1991 | Goda | 430/567 |
| 5,176,993 | 1/1993 | Ohshima | 430/569 |

FOREIGN PATENT DOCUMENTS 0244184 11/1987 European Pat. Off. .
2418278 10/1974 Fed. Rep. of Germany .
3510968 10/1985 Fed. Rep. of Germany .

OTHER PUBLICATIONS

Photographic Science and Engineering, vol. 18, No. 5 pp. 475–485.
Patent Abstracts of Japan, vol. 12, No. 129 [P-692].

*Primary Examiner*—Marion E. McCamish
*Assistant Examiner*—Janis L. Dote
*Attorney, Agent, or Firm*—Sughrue, Mion, Zinn, Macpeak & Seas

[57] ABSTRACT

A silver halide photographic material having provided on a support, at least one red sensitive emulsion layer comprising a silver halide emulsion having a silver chloride content of from 90 to 100 mol % and spectrally sensitized by a red sensitizing dye having a reduction potential at a value of $-1.27$ (V vs SCE) or more negative and a nitrogen-containing heterocyclic compound, exhibits reduced fluctuation in photographic sensitivity depending on the change in the printing temperature and reduced fluctuation in photographic sensitivity due to long term storage under the normal condition.

16 Claims, No Drawings

SILVER HALIDE PHOTOGRAPHIC MATERIAL

This is a continuation of application Ser. No. 07/259,631 filed Oct. 19, 1988, now abandoned.

FIELD OF THE INVENTION

The present invention relates to a silver halide photographic material and, more particularly, it relates to a silver halide photographic material exhibiting reduced variation or fluctuation in photographic sensitivity depending on the printing temperature and due to long term storage under the normal condition.

BACKGROUND OF THE INVENTION

For those products such as photosensitive material for use in color photographic paper that are used in such a field where a large amount of printed products has to be completed in a short time of delivery, silver chlorobromide containing substantially no silver iodide has been used in view of the necessity for increasing the developing speed.

The demand for the improvement of rapid processability of color photographic paper has greatly increased and various studies have been made in recent years in response thereto. It is well-known that the developing speed can be greatly improved by increasing the silver chloride content in the silver halide emulsion used.

Meanwhile, it is also well known that a technique of adding a sensitizing dye to a silver halide emulsion upon preparing a silver halide photographic material extends the region of light sensitive wavelength of the silver halide emulsion thereby optically sensitizing the same.

Various compounds are known as spectral sensitizing dyes used for such a purpose and there can be mentioned, for example, cyanine dyes, merocyanine dyes and xanthene dyes as described in "The Theory of the Photobraphic Process", third edition, p 198–228, edited by T. H. James, published by Macmillan Co. N.Y., 1966.

In the case of applying these sensitizing dyes to silver halide emulsions, it is usually necessary that they not only extend the region of light sensitive wavelength of the silver halide emulsion but also satisfy the following conditions:

(1) have a proper area of spectral sensitization,
(2) have good sensitizing efficiency to obtain a sufficiently high sensitivity,
(3) cause no fogging,
(4) show less scattering of sensitivity due to the temperature change upon exposure,
(5) have no undesirable interactions with other additives, for example, stabilizers, antifoggants, coating aids and color forming agents,
(6) cause no sensitivity reduction when a silver halide emulsion containing the sensitizing dye is preserved, particularly under high temperature and high humidity conditions, and
(7) do not diffuse to other photosensitive layers, which would lead to color turbidity (mixing of color).

The above-mentioned conditions are of critical importance, particularly, upon preparation of a red sensitive silver halide emulsion in a silver halide color photographic material.

However, in the case of using a so-called "high silver chloride emulsion containing a high content of silver chloride which has been increasingly demanded as described above, it is indeed difficult to obtain a red sensitizing dye capable of completely satisfying the above-mentioned conditions to the same extent as emulsions mainly composed of silver bromide. As the result of further specific study by the present inventors, it has been found that the variation in the sensitivity depending on the temperature change upon exposure, that is, the printing temperature dependency, is greatly increased in the case of using a high silver chloride emulsion as compared with using an emulsion mainly composed of silver bromide.

The correlation between the sensivitivity of spectral sensitization of a high silver chloride emulsion and the reduction potential of a spectral sensitizing dye therefor has been reported in "Photographic Science and Engineering", vol. 18, p 475–485 (1974) and "The Journal of Photographic Science", vol. 21, p 180–186 (1973). Further, to improve the spectral sensitivity, long term storage stability and anti-infrared fogging of a silver halide emulsion containing silver chloride spectrally sensitized with a specific red sensitizing dye, it has been proposed to add a nitrogen-containing compound as disclosed in JP-B No. 46-10473 (the term "JP-B" as used herein means an "examined Japanese patent publication") and JP-B No. 48-42494, a supersensitizer as disclosed in JP-A No. 50-5035 (the term "JP-A" as used herein means an "unexamined published Japanese patent application"), a water-soluble bromide as disclosed in JP-A No. 52-151026, iridium as disclosed in JP-A No. 54-23520 and a film hardener as disclosed in JP-A No. 60 202436. It has also been proposed in JP-A No. 58-7629 to improve the addition method of spectral sensitizing dye and, further, to use silver chlorobromide having a (100) face and a (111) face as disclosed in JP-A No. 60-225147.

However, although the printing temperature dependency is remarkably worsened by the use of the silver chloride emulsion as compared with the emulsion mainly composed of silver bromide, the above-mentioned publications disclose nothing in terms of a technique of improving the printing temperature dependency by reducing the variation in sensitivity depending on the temperature change upon exposure. In addition, improvement in the long term storage stability has also been insufficient by the known methods. In view of the above, a high silver chloride photographic material exhibiting no variation in sensitivity depending on the temperature change upon exposure and having excellent long term storage stability has been desired.

SUMMARY OF THE INVENTION

Accordingly, it is a first object of the present invention to provide a silver halide photographic material containing a high silver chloride emulsion spectrally sensitized by a red sensitizing dye which exhibits no variation or fluctuation in photographic sensitivity depending on the printing temperature.

A second object of the present invention is to reduce the variation or fluctuation photographic sensitivity due to long term storage under the normal condition.

The foregoing objects and other objects of the present invention are attained by a silver halide photographic material having, on a support at least one red sensitive emulsion layer containing a silver halide emulsion having a silver chloride content of from 90 to 100 mol % and spectrally sensitized by a red sensitizing dye having a reduction potential at a value of $-1.27$ (V vs SCE) or more negative and a nitrogen-containing heterocyclic compound.

DETAILED DESCRIPTION OF THE INVENTION

The present invention will now be described in more detail.

The red sensitizing dye used in the present invention has a reduction potential at a value of $-1.27$ (V vs SCE) or more negative. A red sensitive sensitizing dye having the reduction potential at a value of $-1.285$ (V vs SCE) or more negative is preferred. The reduction potential is measured by the phase selected second harmonic wave AC polarography. To explain more specifically, acetonitrile (spectral grade) dried in a 4A-1/16 molecular sieve is used as the solvent for the red sensitizing dye and normal tetrapropyl ammonium perchlorate (special grade reagent for polarography) is used as a supporting electrolyte for the red sensitizing dye. The sample solution is prepared by dissolving the red sensitizing dye in an amount of $10^{-3}$ to $10^{-5}$ mol/l into acetonitrile containing 0.1 M of the supporting electrolyte, from which oxygen was removed for a period of more than 15 minutes using an aqueous high alkali solution of pyrogallol and, further, argon gas at high purity passed through calcium chloride (99.999 %) before measurement. A dropping mercury electrode is used for the operation electrode, a saturated calomel electrode (SCE) for the reference electrode and platinum for the counter electrode. The reference electrode and the sample solution are connected with a Luggin tube filled with acetonitrile containing 0.1 M of the supporting electrolyte and the liquid junction was made of Vycol glass. Measurement is conducted at 25° C. while separating the top end of the Luggin tube from the top end of the mercury capillary to a distance from 5 to 8 mm. The measurement of the reduction potential by the phase selected second harmonic wave AC voltammetry using platinum for the operation electrode is described in "Journal of Imaging Science", vol. 30, p 27-35 (1986).

The red sensitizing dye used in the present invention is preferably represented by the following general formula (I):

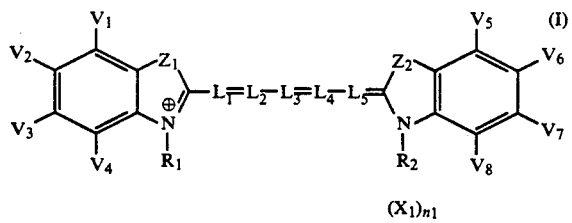

where $Z_1$ represents

or an oxygen, sulfur or selenium atom, and $Z_2$ represents an oxygen, sulfur or selenium atom. $R_5$ has the same meanings as $R_1$.

$L_1$, $L_2$, $L_3$, $L_4$ and $L_5$ each represents a methine group, which may be substituted with a substituted or non-substituted alkyl group (for example, methyl, ethyl), a substituted or non-substituted aryl group (for example, phenyl) or a halogen atom (for example, chlorine, bromine). The methine group may form a ring together with other methine group.

$R_1$ and $R_2$ each represents an alkyl group, preferably, a non-substituted alkyl group with 18 or less carbon atoms (for example, methyl, ethyl, propyl, butyl, pentyl, octyl, decyl, dodecyl, octadecyl); a substituted alkyl group [which may be substituted by, for example, a carboxy group, a sulfo group, a cyano group, or a halogen atom (for example, fluorine, chlorine, bromine)]; a hydroxy group; an alkoxycarbonyl group with 8 or less carbon atoms (for example, methoxycarbonyl, ethoxycarbonyl, phenoxycarbonyl, benzyloxy carbonyl); an alkoxy group with 8 or less carbon atoms (for example, methoxy, ethoxy, benzyloxy, phenethyloxy); a monocyclic aryloxy group with 10 or less carbon atoms (for example, phenoxy, p-tolyloxy); an acyloxy group with 3 or less carbon atoms (for example, acetyloxy, propionyloxy); an acyl group with 8 or less carbon atoms (for example, acetyl, propionyl, benzoyl, mesyl); a carbamoyl group (for example, carbamoyl, N,N-dimethylcarbamoyl, morpholinocarbonyl, piperidinocarbonyl); a sulfamoyl group (for example, sulfamoyl, N,N-dimethylsulfamoyl, morpholinosulfonyl, piperidinosulfonyl); or an alkyl group with 18 or less carbon atoms substituted with an aryl group with 6 to 10 carbon atoms (for example, phenyl, 4-chlorophenyl, 4-methylphenyl, α-naphthyl).

Particularly preferred are a unsubstituted alkyl group (for example, methyl, ethyl) and a sulfoalkyl group (for example, 2-sulfoethyl, 3-sulfopropyl, 4-sulfobutyl).

Alternatively, $R_1$ may bond to $L_1$, and/or $R_2$ may bond to $L_5$, to form a 5- or 6-membered carbocyclic ring.

$V_1$, $V_2$, $V_3$, $V_4$, $V_5$, $V_6$, $V_7$ and $V_8$ each represents a hydrogen atom; a halogen atom (for example, chlorine, fluorine, bromine); a non-substituted alkyl group, preferably a non-substituted alkyl group with 10 or less carbon atoms (for example, methyl, ethyl); a substituted alkyl group, preferably a substituted alkyl group with 18 or less carbon atoms (for example, benzoyl, α-naphthylmethyl, 2-phenylethyl, trifluoromethyl); an acyl group, preferably an acyl group with 10 or less carbon atoms (for example, acetyl, benzoyl, mesyl); an acyloxy group, preferably an acyloxy group with 10 or less carbon atoms (for example, acetyloxy); an alkoxycarbonyl group, preferably an alkoxycarbonyl group with 10 or less carbon atoms (for example, methoxycarbonyl, ethoxycarbonyl or benzyloxycarbonyl); a substituted or non-substituted carbamoyl group (for example, carbamoyl, N,N-dimethylcarbamoyl, morpholinocarbamoyl, piperidinocarbamoyl); a substituted or non-substituted sulfamoyl group (for example, sulfamoyl, N,N-dimethylsulfamoyl, morpholinosulfonyl, piperidinosulfonyl); a carboxy group; a cyano group; a hydroxy group; an amino group; an acylamino group, more preferably an acylamino group with 8 or less carbon atoms (for example, acetylamino); an alkoxy group, more preferably an alkoxy group with 10 or less carbon atoms (for example, methoxy, ethoxy, benzyloxy); an alkylthio group (for example, ethylthio); an alkylsulfonyl group (for example, methylsulfonyl); a sulfonic acid group; an aryloxy group (for example, phenoxy); or an aryl group (for example, phenyl, tollyl). Furthermore, two of $V_1$-$V_8$ that are joined with adjacent carbon atoms can be bonded together to form a condensed ring. As the condensed ring, there can be mentioned, for example, a benzene ring or a heterocyclic ring (for example, pyrrole, thiophene, furan, pyridine, imidazole, triazole, thiazole).

($X_1$) represents a cation or anion required for neutralizing the ionic charge of the dye. $n_1$ represents the number of paired ions required for neutralizing the ionic charge of the dye molecule (that is, an appropriate value of 0 or greater as required) and generally represents 1. When $n_1$ represents 0, the dye forms an inner salt. The paired ion ($X_1$)$n_1$ can easily be exchanged after the preparation of the dye. The cation is typically an organic or inorganic ammonium ion or an alkali metal ion, while the anion may be either an inorganic or organic anion. For instance, there can be mentioned a halogen anion (for example, fluoro, chloro, bromo, iodo), a substituted arylsulfonate ion (for example, p-toluenesulfonate, p-chlorobenzenesulfonate), an aryldisulfonate ion (for example, 1,3-benzenedisulfonate, 1,5-naphthalenedisulfonate, 2,6-naphthalenedisulfonate), an alkylsulfate ion (for example, methylsulfate), sulfate ion, thiocyanate ion, perchlorate ion, tetrafluoroborate ion, picrate ion, acetate ion, trifluoromethanesulfonate ion, etc. Iodo ions are preferred.

Among the red sensitizing dyes represented by the general formula (I), more preferred red sensitizing dyes are represented by the following general formulae (II) and (III). The red sensitizing dyes represented by the following general formula (II) is further more preferred.

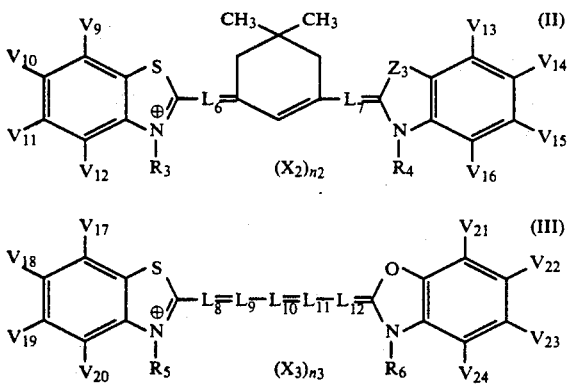

where $Z_3$ represents an oxygen or sulfur atom;

$L_6$ and $L_7$ each represents a methine group;

$R_3$ and $R_4$ have the same meanings as $R_1$ and $R_2$, respectively, in the general formula (I). $R_3$ and $L_6$, and/or $R_4$ and $L_7$ may be bonded to each other to form a 5- or 6-membered carbocyclic ring;

$V_9$, $V_{10}$, $V_{11}$, $V_{12}$, $V_{13}$, $V_{14}$, $V_{15}$ and $V_{16}$ each have the same meaning as defined for $V_1$, $V_2$, $V_3$, $V_4$, $V_5$, $V_6$, $V_7$ and $V_8$, respectively, provided that, however, two of $V_9$ an $V_{16}$ that are joined with adjacent carbon atoms can not form a condensed ring. Assuming the respective Hammett's values $\sigma p = \sigma pi$ (i=9-16) and $Y = \sigma p9 + \sigma p10 + \sigma p11 + \sigma p12 + \sigma p13 + \sigma p14 + \sigma p15 + \sigma p16$, $Y \leq -0.08$ if $Z_3$ is an oxygen atom or $Y \leq -0.15$ if $Z_3$ is a sulfur atom. Preferably, $Y \leq -0.15$ if $Z_3$ is an oxygen atom or $Y \leq -0.30$ if $Z_3$ is a sulfur atom. Particularly preferably, $-0.90 \leq Y \leq -0.17$ if $Z_3$ is an oxygen atom, or $-1.05 \leq Y \leq -0.34$ if $Z_3$ is a sulfur atom.

$\sigma p$ represents a value as shown in "Structural Activity Correlation of Chemicals: Guideline to Drug Design and the Study of Function and Mechanics" p 96-103, extra edition No. 122 for "Kagaku no Ryoiki", edited by Working Group for Structural Activity Correlation, published by Nankodo, and in "Substituent Constants for Correlation Analysis in Chemistry and Biology", p 69-161, written by Corwin Hansch and Albert Leo, published by John Wiley and Sons Co. The method of measuring $\sigma p$ is described in "Chemical Reviews", vol. 17, p 125-136 (1935). Preferably, each of $V_9$, $V_{10}$, $V_{11}$, $V_{12}$, $V_{13}$, $V_{14}$, $V_{15}$ and $V_{16}$ is a hydrogen atom; a non-substituted alkyl group with 6 or less carbon atoms (for example, methyl, ethyl, n-propyl, isopropyl, n-butyl, t-butyl, pentyl, cyclopropyl, cyclobutyl, cyclopentyl, cyclohexyl); a substituted alkyl group with 8 or less carbon atoms (for example, carboxymethyl, 2-carboxyethyl, benzyl, phenethyl, dimethylaminopropyl); a hydroxy group; an amino group (for example, amino, hydroxyamino, methylamino, dimethylamino, diphenylamino); an alkoxy group (for example, methoxy, ethoxy, isopropoxy, propoxy, butoxy, pentoxy); an aryloxy group (for example, phenoxy); or aryl group (for example, phenyl).

($X_2$) and $n_2$ have the same meanings as those for ($X_1$) and $n_1$, respectively, in the general formula (I).

In the general formula (III), $L_8$, $L_9$, $L_{10}$, $L_{11}$ and $L_{12}$ have the same meanings as those for $L_1$, $L_2$, $L_3$, $L_4$ and $L_5$, respectively, in the general formula (I). A methine group substituted with a substituent having a negative Hammett's $\sigma p$ value is preferred and the substituent can include, for example, a substituted or non-substituted alkyl group (for example, methyl, ethyl). More preferably, $L_9$ and $L_{11}$ may be bonded to each other to form a 5- or 6-membered carbocyclic ring.

$R_5$ and $R_6$ have the same meanings as those for $R_1$ and $R_2$, respectively, in the general formula (I).

Referring to any two groups represented by $V_{17}$, $V_{18}$, $V_{19}$, $V_{20}$, $V_{21}$, $V_{22}$, $V_{23}$ and $V_{24}$ that are bonded to adjacent carbon atoms, at least one pair of them may be bonded to each other to form a benzene ring or heterocyclic ring (for example, pyrrole, thiophene, furan, pyridine, imidazole, triazole, thiazole). These rings may further be substituted by a substituent as described for $V_9$-$V_{16}$ in the general formula (II). Other $V_{17}$-$V_{28}$ not contributing to this have the same meanings as those for $V_1$-$V_8$ in the general formula (I).

($X_3$) and $n_3$ have the same meanings as those for ($X_1$) and $n_1$, respectively, in the general formula (I).

Specific examples of the dyes represented by the general formulae (I), (II) and (III) according to the present invention are illustrated below. However, the present invention is not limited only to them.

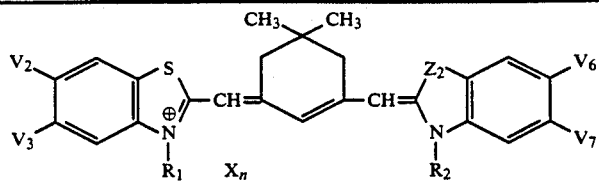

| | $Z_2$ | $R_1$ | $R_2$ | $V_2$ | $V_3$ | $V_6$ | $V_7$ | X | n | $E_R$ |
|---|---|---|---|---|---|---|---|---|---|---|
| I-1 | S | $CH_3CH_2$ | $CH_3CH_2$ | $CH_3$ | H | H | H | $I^-$ | 1 | −1.27 |
| I-2 | " | " | " | $CH_3$ | $CH_3$ | H | H | " | " | −1.29 |
| I-3 | " | " | " | $CH_3$ | H | $CH_3$ | H | " | " | −1.29 |
| I-4 | " | " | " | $CH_3$ | H | H | $CH_3$ | " | " | −1.28 |
| I-5 | " | " | " | H | $CH_3$ | H | $CH_3$ | " | " | −1.27 |
| I-6 | " | " | " | $CH_3O$ | H | H | H | " | " | −1.27 |
| I-7 | S | $CH_3CH_2$ | $CH_3CH_2$ | $CH_3O$ | $CH_3O$ | H | H | $I^-$ | 1 | −1.29 |
| I-8 | " | " | " | $CH_3O$ | H | $CH_3O$ | H | " | " | −1.30 |
| I-9 | " | " | " | $CH_3O$ | H | H | $CH_3O$ | " | " | −1.29 |
| I-10 | " | " | " | H | $CH_3O$ | H | $CH_3O$ | " | " | −1.28 |
| I-11 | " | " | " | $CH_3$ | $CH_3$ | $CH_3$ | $CH_3$ | " | " | −1.33 |
| I-12 | " | " | " | $CH_3O$ | $CH_3O$ | $CH_3O$ | $CH_3O$ | " | " | −1.34 |
| I-13 | " | " | " | $CH_3O$ | $CH_3$ | H | H | " | " | −1.29 |
| I-14 | " | " | " | $CH_3CH_2O$ | H | $CH_3CH_2O$ | H | " | " | −1.30 |
| I-15 | " | " | " | $CH_3CH_2$ | H | $CH_3CH_2$ | H | " | " | −1.28 |
| I-16 | S | $CH_3CH_2$ | $CH_3CH_2$ | $CH_3(CH_2)_2$ | H | $CH_3(CH_2)_2$ | H | $I^-$ | 1 | −1.28 |
| I-17 | " | " | " | $N(CH_3)_2$ | H | H | H | " | " | −1.28 |
| I-18 | " | $(CH_2)_3SO_3{-}$ | " | $CH_3$ | H | $CH_3$ | H | — | — | −1.29 |
| I-19 | " | $(CH_2)_4SO_3{-}$ | " | $CH_3$ | H | $CH_3$ | H | — | — | −1.29 |
| I-20 | " | $(CH_2)_3SO_3{-}$ | $(CH_2)_3SO_3{-}$ | $CH_3$ | H | $CH_3$ | H | $\overset{+}{H}NEt_2$ | 1 | −1.29 |
| I-21 | " | $(CH_2)_4SO_3{-}$ | $(CH_2)_4SO_3{-}$ | $CH_3$ | H | $CH_3$ | H | HN⊕-pyridinium | 1 | −1.29 |
| I-22 | " | $CH_3(CH_2)_4$ | $CH_3CH_2$ | $CH_3$ | H | $CH_3$ | H | $I^-$ | 1 | −1.29 |
| I-23 | " | $CH_3(CH_2)_4$ | $(CH_2)_3SO_4{-}$ | $CH_3$ | H | $CH_3$ | H | — | — | −1.29 |
| I-24 | " | $CH_3$ | $CH_3$ | $CH_3$ | H | $CH_3$ | H | $I^-$ | 1 | −1.29 |
| I-25 | S | $(CH_2)_3SO_4{-}$ | $(CH_2)_4SO_4{-}$ | $CH_3$ | H | $CH_3$ | H | $\overset{+}{H}NEt_2$ | 1 | −1.29 |
| I-26 | " | $CH_3$ | $CH_3(CH_2)_2$ | $CH_3$ | H | $CH_3$ | H | $I^-$ | 1 | −1.29 |
| I-27 | " | $(CH_2)_3SO_3{-}$ | $CH_3(CH_2)_2$ | $CH_3O$ | $CH_3O$ | H | H | — | — | −1.29 |
| I-28 | " | $CH_3CH_2$ | $(CH_2)_3SO_3{-}$ | $CH_3O$ | $CH_3O$ | H | H | — | — | −1.29 |
| I-29 | O | $CH_3CH_2$ | $CH_3CH_2$ | $CH_3$ | H | H | H | $I^-$ | 1 | −1.29 |
| I-30 | " | " | " | H | $CH_3$ | H | H | " | " | −1.28 |
| I-31 | " | " | " | $CH_3$ | $CH_3$ | H | H | " | " | −1.31 |
| I-32 | " | " | " | $CH_3$ | H | $CH_3$ | H | " | " | −1.31 |
| I-33 | " | " | " | $CH_3$ | H | H | $CH_3$ | " | " | −1.30 |
| I-34 | " | " | " | H | $CH_3$ | H | $CH_3$ | " | " | −1.29 |
| (I-35) | | | | | | | | | | −1.29 |

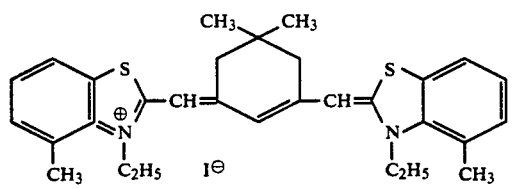

(I-36)  −1.28

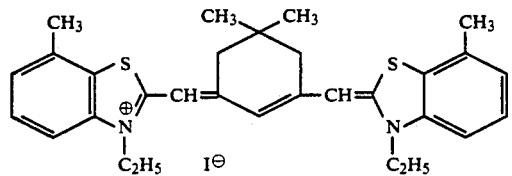

(I-37)  −1.30

-continued
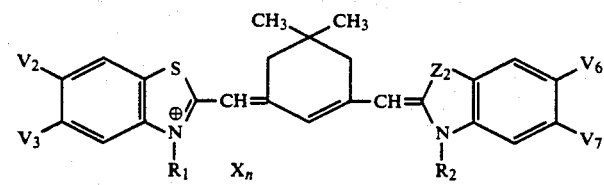
| Z₂ | R₁ | R₂ | V₂ | V₃ | V₆ | V₇ | X | n | E_R |
|---|---|---|---|---|---|---|---|---|---|
(I-38)     −1.29
(I-39)     −1.35
(I-40)     −1.34
(I-41)     −1.34
(I-42)     −1.29

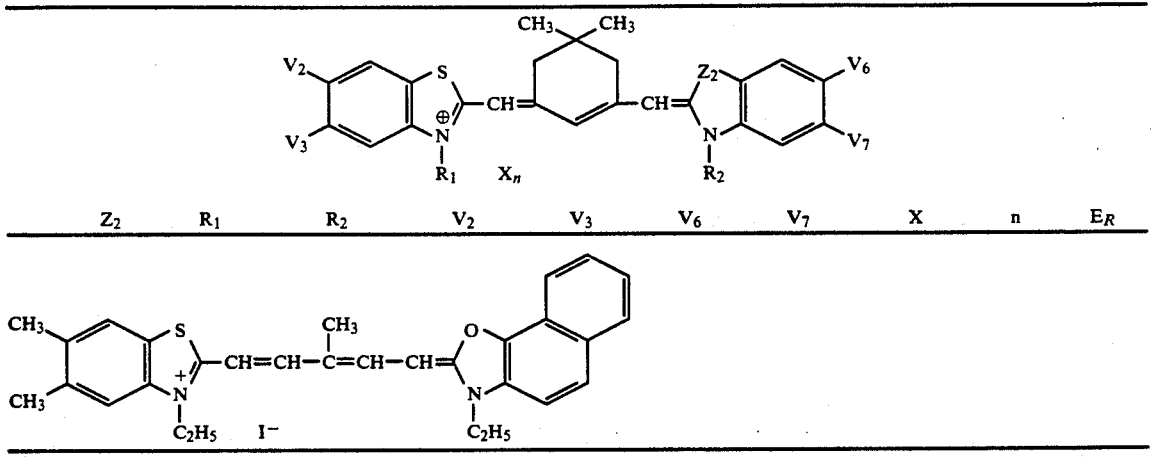

The dye represented by the general formula (I) used in the present invention can be easily synthesized based on the methods as described in, for example, "Heterocyclic Compounds-Cyanine Dyes and Related Compounds" Chapter (IX), pp 270-287, written by F. M. Hamer, published by John Wiley and Sons Co. (1964), "Heterocyclic Compounds-Special Topics in Heterocyclic Chemistry" Chapter (VIII), Sec. (IV) pp 482-515, written by D. M. Sturmer, published by John and Wiley Sons Co. (1977).

The spectral sensitizing dyes represented by the foregoing general formula (I), (II) or (III) may be incorporated into the silver halide emulsion according to the present invention by dispersing them directly into the emulsion, or may be added to the emulsion after being dissolved into a solvent such as water, methanol, ethanol, propanol, methyl cellosolve, 2,2,3,3-tetrafluoropropanol, etc. used alone or as a solvent mixture. Further, an aqueous solution prepared by mixing an acid or base together as described in, for example, JP-B Nos. 44-23389, 44-27555 and 57-22089, or an aqueous solution or colloidal dispersion prepared by incorporating a surface active agent together as described in, for example U.S. Pat. Nos. 3,822,135 and 4,006,025 may be added to the emulsion. Further they may be dissolved into a solvent substantially immiscible with water such as phenoxy ethanol, which is then dispersed in water or a hydrophilic colloid and then added to the emulsion. They may be dispersed directly into a hydrophilic colloid and the dispersion may be added to the emulsion a described in, for example, JP-A Nos. 53-102733 and 58-105141. The spectral sensitizing dyes can be added to the emulsion at any stage of the preparation of the emulsion which has been known as useful. However, the addition is usually conducted at a time between the completion of the chemical sensitization and before the coating. They may be added at the same time with the chemical sensitizer to conduct spectral sensitization simultaneously with the chemical sensitization as described, in for example, U.S. Pat. Nos. 3,628,969 and 4,225,666, or prior to the chemical sensitization as described in JP-A No. 58-113928. Alternatively, they may be added before the formation of precipitation of silver halide grains has been completed to thereby initiate the spectral sensitization. Furthermore, it is also possible as described in U.S. Pat. No. 4,225,666 to add the compound in portions, that is, to add a portion of the compound before the chemical sensitization and add the remaining protion after the chemical sensitization. It also may be conducted at any time during formation of silver halide grains including the method as shown in U.S. Pat. No. 4,183,756.

The addition amount of the compound represented by the general formula (I), (II) or (III) may be generally about from $4 \times 10^{-6}$ to $8 \times 10^{-3}$ mol, preferably from $1 \times 10^{-6}$ to $1 \times 10^{-3}$ mol, more preferably from $5 \times 10^{-5}$ to $5 \times 10^{-4}$ mol based on one mol of the silver halide of the silver halide emulsion in the layer containing the high silver chloride emulsion.

The nitrogen-containing heterocyclic compound used in the present invention is preferably a compound having a saturated or unsaturated 5-7 membered ring containing at least one nitrogen atom as the hetero atom, and the ring may further contain a substituent or condensed ring. Further, the ring may contain hetero atoms other than nitrogen. Preferred compounds are represented by the following general formula (IV):

$$Z-Y \qquad (IV)$$

in which Z represents an azole ring (for example, imidazole, triazole, tetrazole, thiazole, oxazole, selenazole, benzimidazole, benzindazole, benztriazole, benzoxazole, benzthiazole, thiadiazole, oxadiazole, benzselenazole, pyrazol, naphthothiazole, napthoimidazole, naphthoxazole, azabenzimidazole, purine); a pyrimidine ring; a triazine ring; a pyridine ring; or azaindene ring (for example, triazaindene, terazaindene, pentazaindene).

Further, Y represents a hydrogen atom or a substituent group and specific examples of the substituent can include a substituted or non-substituted alkyl group (for example, methyl, ethyl, hydroxyethyl, trifluoromethyl, sulfopropyl, dipropylaminoethyl, adamantane); an alkenyl group (for example, allyl); an aralkyl group (for example, benzyl, p-chlorophenethyl); an aryl group (for example, phenyl, naphthyl, p-carboxyphenyl, 3,5-dicarboxyphenyl, m-sulfophenyl, p-acetamidophenyl, 3-caprylamidophenyl, p-sulfamoylphenyl, m-hydroxyphenyl, p-nitrophenyl, 3,5-dichlorophenyl, 2-methoxyphenyl); a hetero ring residue (for example, pyridine); a halogen atom (for example, chlorine, bromine); a mercapto group; a cyano group; a carboxyl group; a sulfo group; a hydroxy group; a carbamoyl group; a sulfamoyl group; an amino group; a nitro group; an alkoxy group (for example, methoxy, ethoxy); an aryloxy group (for example, phenoxy); an acyl group (for example, acetyl); an acylamino group (for example, acethylamino, capramide, methylsufonylamino); a substituted amino group (for example, diethylamino, hydroxylamino); an alkylthio or arylthio group (for example, methylthio, carboxyethylthio, sulfobutylthio); an alkoxycarbonyl group (for example, methoxycarbonyl); or an aryloxycarbonyl group (for example, phenoxycarbonyl).

Other preferred examples of the nitrogen-containing heterocyclic compound may be a disulfide form represented by the following general formula (V):

Z—S—S—Z (V)

wherein Z has the same meanings as Z in the general formula (VI) or a compound having a thioketone group represented by the formula (VI):

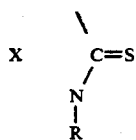 (VI)

in which R represents an alkyl group, an aralkyl group, an alkenyl group or an aryl group.

X represents a group of atoms required for forming a 5- or 6-membered ring, which may be condensed.

The heterocyclic ring formed with X is, for example, thiazoline, thiazolizine, selenazoline, oxazoline, oxazolizine, imidazoline, imidazolizine, thiadiazoline, oxadiazoline, triazoline, tetrazoline and pyrimidine, as well as benzthiazoline, naphthothiazoline, tetrahydrobenzthiazoline, benzimidazoline or benzoxazoline in which the carbocyclic or heteroxylic ring is condensed.

These heterocyclic rings may be substituted with the substituent Y referred to for the compound of the general formula (IV).

R can include, specifically, an alkyl group (for example, methyl, propyl, sulfopropyl, hydroxyethyl); an alkenyl group (for example, allyl); an aralkyl group (for example, benzyl); an aryl group (for example, phenyl, p-tolyl and o-chlorophenyl); or a heterocyclic group (for example, pyridyl).

The heterocylic compound containing nitrogen of the present invention is preferably an azole.

The heterocyclic compound containing the nitrogen is more preferably an azole containing a mercapto group.

Examples of typical compounds represented by the general formula (IV) are shown below.

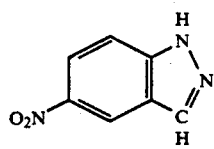 (IV-1)

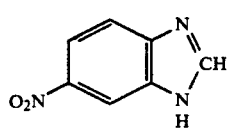 (IV-2)

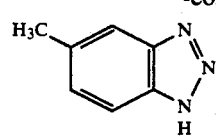 (IV-3)

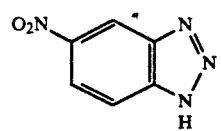 (IV-4)

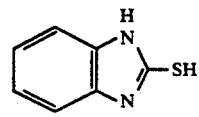 (IV-5)

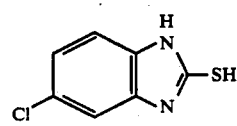 (IV-6)

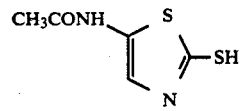 (IV-7)

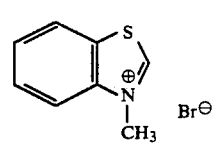 (IV-8)

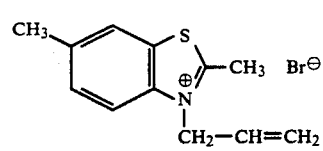 (IV-9)

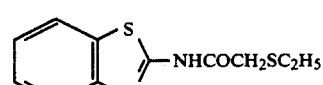 (IV-10)

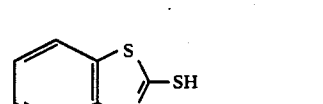 (IV-11)

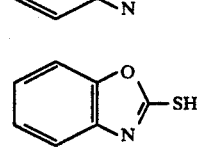 (IV-12)

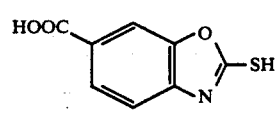 (IV-13)

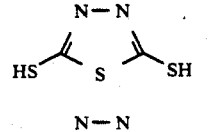 (IV-14)

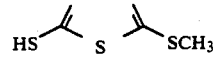 (IV-15)

-continued
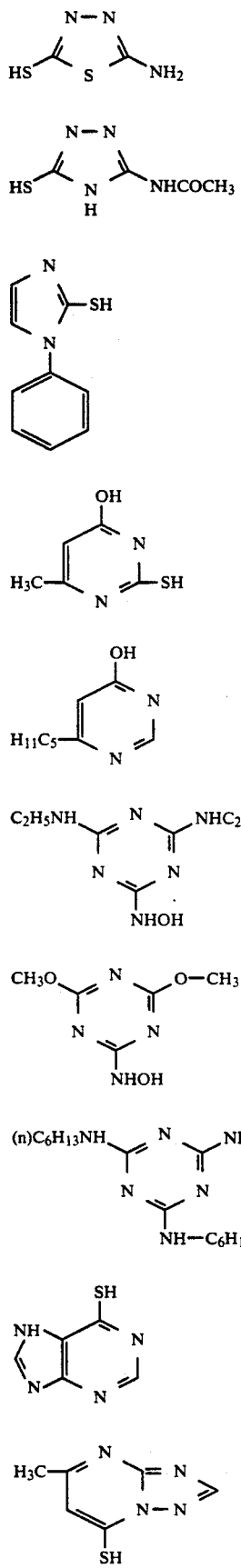
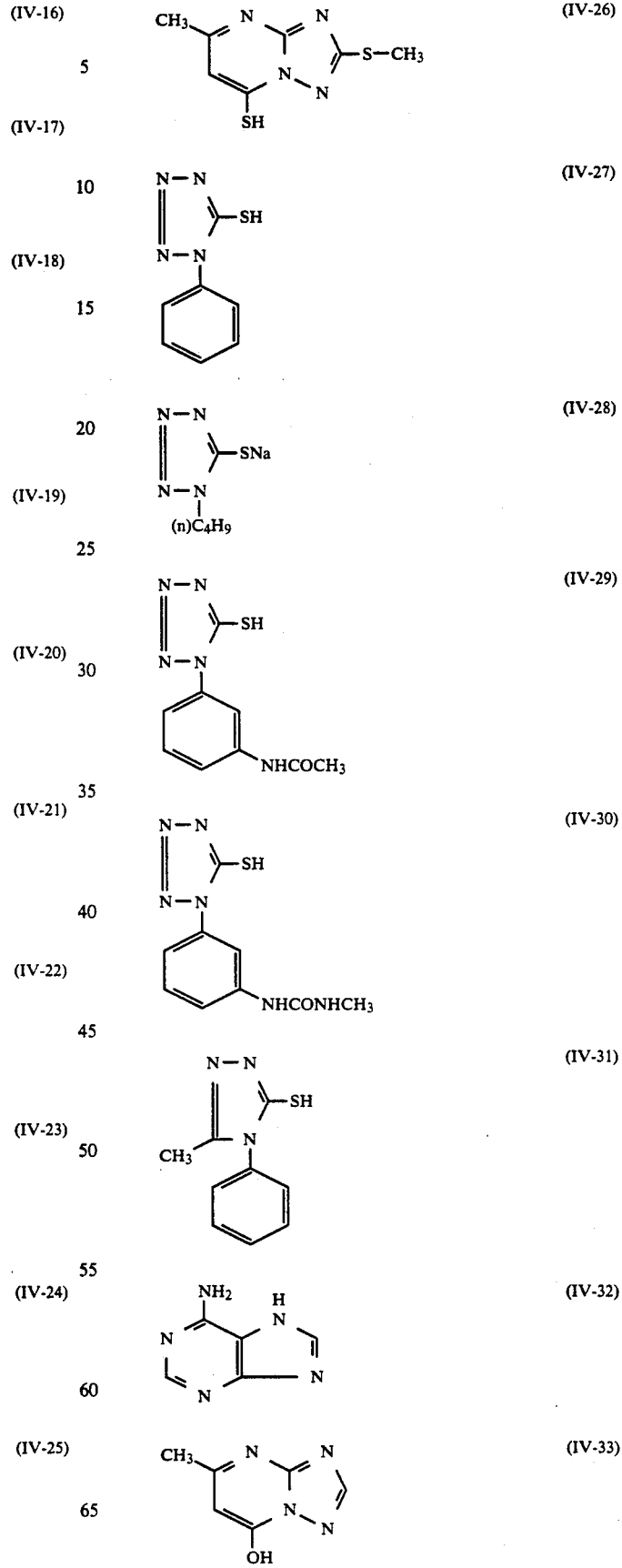

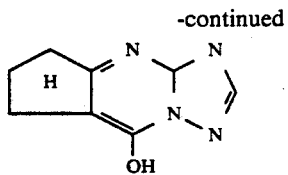 (IV-34)

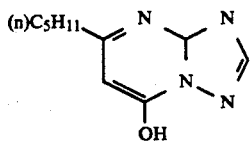 (IV-35)

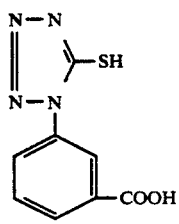 (IV-36)

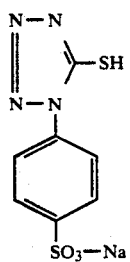 (IV-37)

Examples of typical compounds represented by the general formula (V) are shown below.

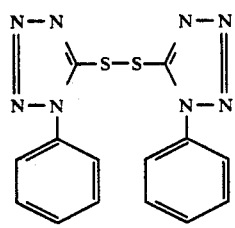 (V-1)

Examples of typical compounds represented by the general formula (VI) are shown below.

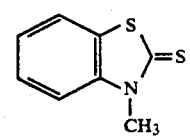 (VI-1)

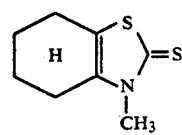 (VI-2)

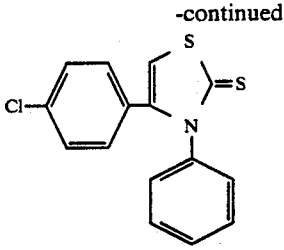 (VI-3)

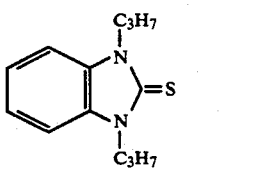 (VI-4)

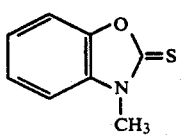 (VI-5)

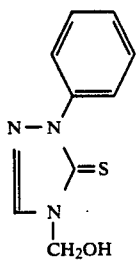 (VI-6)

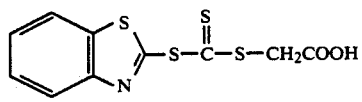 (VI-7)

These compounds can be synthesized by the methods disclosed in "Stabilization of Photographic Silver Halide Emulsions" written by E. G. Birr, published by Focal Press Co., 1974, "Reports on the Progress of Applied Chemistry", vol. 59, pp 159 (1974), *Research Disclosure* No. 17643 (1978), JP-B Nos. 48-34169, 47-18008, 49-23368, "Journal of Pharmacology (Yakugaku Zassi)", vol. 74, pp. 1365-1369 (1954), "Beilstein", chapter XII, p. 394 and Chapter IV, p. 121, etc.

For adding the nitrogen-containing heterocyclic compound to a dispersing medium such as gelatin, the addition method of the spectral sensitizing dye described above may be employed.

The content of the nitrogen-containing heterocyclic compound in the dispersing medium is generally from $1 \times 10^{-5}$ to $4 \times 10^{-2}$ mol/silver mol, preferably from $5 \times 10^{-5}$ to $2 \times 10^{-2}$ mol/silver mol, and more preferably from $1 \times 10^{-4}$ to $4 \times 10^{-2}$ mol/silver mol.

The time of adding the nitrogen-containing heterocyclic compound may be at any stage before or after the completion for the preparation of the emulsion. Further, it may be added in two or more separate portions.

For the halogen composition of the silver halide grains used in the present invention, it is necessary that 90 mol % or more of the entire silver halide constituting the silver halide grains is silver chloride. It is desired that the composition contains substantially no silver iodide. No substantial content of the silver iodide means that the silver iodide content is not more than 1.0 mol %. A preferred halogen composition of the silver halide grains is a silver bromochloride containing substantially no siver iodide in which 95 mol % or more of the entire silver halide constituting the silver halide grains is silver chloride. A most preferred halogen compositon is a silver bromochloride containing substantially no silver iodide in which 97 mol % or more of the entire silver halide constituting silver halide grains is silver chloride. In position of inhibition of fog, etc., a preferred halogen composition is silver bromochloride containing substantially no silver iodide in which about 95.5 mol % or less of the entire silver halide constituting silver halide grains is silver chloride.

The silver halide grains used in the present invention preferably have a localized phase in which the silver bromide content exceeds at least 20 mol %. The localized phase means a part whose silver bromide content is higher than that of its surroundings at the surface or in the inside of the silver halide grains. The localized phases of such a different silver bromide content can optionally be disposed depending on the purpose, such that the localized phase of relatively high silver bromide content as compared with that of its surroundings may be in the inside, at the surface or at the sub-surface of the silver halide grains, and it may be both in the inside and at the surface (the sub-surface). Further, the localized phase may constitute a layered structure as surrounding the silver halide grains in the inside or at the surface, or it may be discontinuously isolated at the surface or in the inside of the silver halide grains. One of preferred specific examples for the disposition of the localized phase of relatively high silver bromide content as compared with that of its surroundings is such that the localized phase containing at least 20 mol % of the silver bromide content is epitaxially grown locally at the surface of the silver halide grains.

Although it is necessary that the silver bromide content of the localized phase exceeds 20 mol %, if the silver bromide content is too high, unfavorable properties may develop in the photosensitive materials in that desensitization is caused when a pressure is applied to the photosensitive material or the sensitivity and the gradation are greatly changed due to the variation in the composition of the processing solution, etc. In view of the above, the silver bromide content of the localized phase is preferably within a range from 20 to 60 mol % and most preferably within a range from 30 to 50 mol %. The silver bromide content of the localized phase can be analyzed by using the X-ray diffractiometry (described in, for example, "New Experimental Chemical Study 6, Structural Analysis" edited by Chemical Society of Japan, published by Maruzen), or XPS method (described in, for example, "Surface Analysis, IMA—Application of Auger Electron—Photoelectron Spectroscopy", published by Kodansha Co.).

The localized phase is constituted with silver in an amount preferably from 0.1 to 20 % and more preferably from 0.5% to 7% for the entire amount of silver constituting the silver halide grains according to the present invention.

The boundary between the localized phase with such a high silver bromide content and another phase may have a distinct phase boundary or may have a short transition region in which the halogen composition is changed gradually.

Various methods can be used for forming a localized phase of such a relatively high silver bromide content as compared with that of its surroundings. For example, the localized phase can be formed by reacting a soluble silver salt and a soluble halogen salt by a single-jet method or a double-jet method. Further, the localized phase may also be formed by using a so-called conversion method including a step of converting an already formed silver halide into a silver halide having a lower solubility product. Alternatively, the localized phase can be formed by adding fine silver bromide grains thereby recrystallizing them on the surface of the sivler chloride grains as disclosed in EP No. 0,273,430.

It is preferred in point of further improving the effects of the present invention that a metal ion other than a silver ion (for example, metal ions belonging to the VIII group in the periodic table, transition metal ions belonging to the II group, a lead ion and a thallium ion) or the complex ion thereof is introduced into the localized phase or other portions (substrate) in silver halide grains of the present invention. A metal ion selected from an iridium ion, a rhodium ion, an iron ion, etc., or the combination of the aforementioned metal ion with the complex ion thereof can be used mainly in the localized phase, and a metal ion selected from an osmium ion, an iridium ion, a rhodium ion, a platinum ion, a ruthenium ion, a palladium ion, a cobalt ion, a nickel ion, an iron ion, etc., or the combination of the aforementioned metal ion with the complex ion thereof can be used mainly in the substrate. The type and concentration of the metal ion in the localized phase may be different from those in the substrate.

In order to introduce the metal ion into the localized phase and/or the substrate in the silver halide grains the metal ion can be added to a solution for preparation of the silver halide grains before or during the formation or during the physical ripening. For example, the silver halide grains can be formed, with the metal ion being added to an aqueous gelatin solution, an aqueous halide solution, an aqueous silver salt solution or other aqueous solutions. Alternatively, the metal ion can be introduced into the localized phase and/or the substrate in the silver halide grain by the steps of adding silver halide fine grains previously containing the metal ion to the desired silver halide emulsion and then dissolving the silver halide fine grains. The latter method is particularly effective for introducing the metal ion into the silver bromide localized phase on the surface of the silver halide grains. The addition method can be properly changed depending on the position which the metal ion is introduced into in the silver halide grains. Especially, the localized phase is preferably deposited together with at least 50% of the entire amount of iridium added in case of preparing the silver halide grains. The localized phase is more preferably deposited together with at least 80% of the entire amount of iridium added. The localized phase is particularly preferably deposited together with the entire amount of iridium added. The term "the localized phase is deposited together with an iridium ion" as used herein means that the iridium compound is supplied simultaneously with, immediately before or immediately after the supply of silver and/or halogen for forming the localized phase.

The silver halide grains according to the present invention preferably have a (100) face, a (111) face at the outer surface, may have both of these faces or, further, may have faces of even higher dimension. Those grains mainly composed of a (100) face are most preferred. The shape of the silver halide grains according to the present invention may also have an irregular crystal form such as a spherical form. They may be tabular grains and the emulsion may contain those tabular grains with the length/thickness ratio of 5 or greater, particularly, 8 or greater in an amount of more than 50% of the entire projected surface area of the grains.

The size of the silver halide grains according to the present invention may be within a range usually employed and it is preferred that the average grain size is from 0.1 μm to 1.5 μm. The grain distribution may be either a polydispersion or a monodispersion, but the monodispersion is more preferred. The grain size distribution representing the degree of the monodispersion is preferably at most 0.2 and more preferably at most 0.15 when expressed as the ratio (s/d̄) between the statistical standard deviation (s) and the average grain size (d̄). Furthermore, two or more kinds of monodisperse emulsions may be used in admixture.

A supersensitizer can be used together with the red sensitizing dye according to the present invention.

Supersensitization is described in, for example, "Photographic Science and Engineering", vol. 13, pp 13–17 (1969), and vol. 18, pp 418–430 (1974), and in "The Theory of the Photographic Process", fourth edition, p 259 (1977) edited by James and published by Macmillan Press Co. Higher sensitivity can be obtained by properly selecting the combination for the sensitizing dye and the supersensitizer.

Although any of the above-mentioned supersensitizers may be used, the compounds represented by the general formula (VII) are particularly preferred.

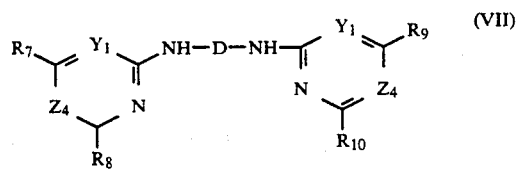

in which D represents a divalent aromatic residue, $R_7$, $R_8$, $R_9$ and $R_{10}$ each represents a hydrogen atom, a hydroxy group, an alkoxy group, an aryloxy group, a halogen atom, a heterocyclic group, a mercapto group, an alkylthio group, an arylthio group, a heterocyclicthio group, an amino group, an alkyl-amino group, a cyclohexylamino group, an arylamino group, a heterocyclicamino group, an aralkylamino group or an aryl group.

$Y_1$ and $Z_4$ each represents —N= or —CH= provided that at least one of them is —N=.

Now, general formula (VII) will be described in even more detail.

D represents a divalent aromatic residue, for example, a residue of a single aromatic ring, a residue of at least two aromatic rings condensed with each other, a residue of at least two aromatic rings bonded directly or by way of an atom or an aromic groups to each other (and more specifically, those having biphenyl, naphthylene, stilbene and bibenzyl skeleton ring). Those represented by the following $D_1$ and $D_2$ are particularly preferred.

$D_1$:

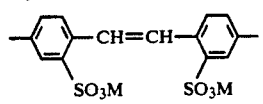

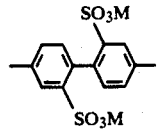

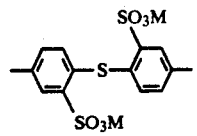

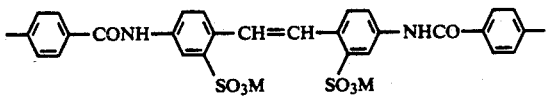

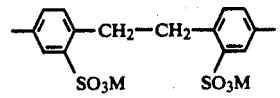

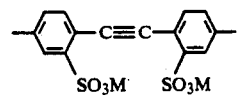

in which M represents a hydrogen atom or a cation providing water solubility (for example, an alkali metal ion such as Na or K), or an ammonium ion.

$D_2$:

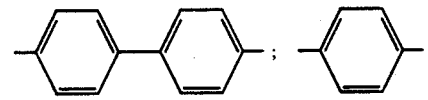

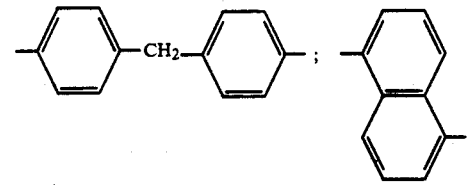

In the case of $D_2$, at least one of $R_7$, $R_8$, $R_9$ and $R_{10}$ has a substituent containing $SO_3M$. M has the same meaning as described above.

$R_7$, $R_8$, $R_9$ and $R_{10}$ each represents a hydrogen atom; a hydroxy group; an alkoxy group (for example, methoxy, ethoxy); an aryloxy group (for example, phenoxy, naphthoxy, o-toloxy, p-sulfonphenyl); a halogen atom (for example, chlorine, bromine); a heterocyclic group (for example, morpholinyl, piperidyl); a mercapto group; an alkylthio group (for example, methylthio, ethylthio); an arylthio group (for example, phenylthio, tolylthio); a heterocyclylthio group (for example, benzothiazoylthio, benzoimidazoylthio, phenyltetrazolylthio); an amino group; an alkylamino group (for example, methylamino, ethylamino, propylamino, dimethylamino, diethylamino, dodecylamino, β-hydroxyethylamino, di-β-hydroxyethylamino, β-sulfoethylamino); a cyclohexylamino group; an arylamino group (for example, anilino, o-, m- or p-sulfoanilino, o-, m- or p-chloroanilino, o-, m- or p-anisidino, o-, m- or p-toluidino, o-, m- or p-carboxylanilino, hydroxylanilino, sulfonaphthylamino, o-, m- or p-aminoanilino, o-acetaminoanilino); a heterocyclylamino group (for example, 2-benzothiazolylamino, 2 pyridylamino); an aralkylamino group (for example, benzylamino); or an aryl group (for example phenyl).

Among the compounds represented by the general formula (VII), those compounds in which at least one of $R_7$ to $R_{10}$ is an aryloxy group, a heterocyclylthio group or a heterocyclylamino group are more preferred.

Typical examples of the compounds represented by the general formula (VII) are shown below but with no restriction thereto.

(VII-1):Disodium 4,4'-bis[2,6-di(benzothiazolyl-2-thio)-pyrimidin-4-ylamino]stilbene-2,2'-disulfonate
(VII-2):Disodium 4,4'-bis[2,6-di(benzothiazolyl-2-amino)pyrimidin-4-ylamino]stilbene-2,2'-disulfonate
(VII-3):Disodium 4,4'-bis[2,6-di(1-phenyltetrazolyl-5-thio)pyrimidin-4-ylamino]stilbene-2,2'-disulfonate
(VII-4):Disodium 4,4'-bis[2,6-di(benzothiazolyl-2-thio)-pyrimidin-4-ylamino]stilbene-2,2'-disulfonate
(VII-5):Disodium 4,4'-bis[2-chloro-6-(2-naphthyloxy)-pyrimidin-4-ylamino]biphenyl-2,2'-disulfonate
(VII-6):Disodium 4,4'-bis[2,6-di(naphthyl-2-oxy)-pyrimidin-4-ylamino]stilbene-2,2'-disulfonate
(VII-7):Disodium 4,4'- bis[2,6-di(naphthyl-2-oxy)-pyrimidin-4-ylamino]stilbene-2,2'-disulfonate
(VII-8):Disodium 4,4'-bis(2,6-diphenoxypyrimidin-4-yl-amino)stilbene-2,2'-disulfonate
(VII-9):Disodium 4,4'-bis(2,6-diphenylthiopyrimidin-4-ylamino)stilbene-2,2'-disulfonate
(VII-10):Disodium 4,4'-bis(2,6-dichloropyrimidin-4-yl-amino)stilbene-2,2'-disulfonate
(VII-11):Disodium 4,4'-bis(2,6-dianilinopyrimidin-4-yl-amino)stilbene-2,2'-disulfonate
(VII12):Disodium 4,4'-bis[4,6-di(naphthyl-2-oxy)triazin-2-ylamino]stilbene-2,2'-disulfonate
(VII-13):Disodium 4,4'-bis(4,6-dianilinotriazin-2-yl-amino)stilbene-2,2'-disulfonate
(VII-14):Disodium 4,4'-bis(2,6-dimercaptopyrimidin-4-yl-amino)biphenyl-2,2'-disulfonate
(VII-15):Disodium 4,4'-bis[4,6-di(naphthyl-2-oxy)-pyrimidin-2-ylamino]stilbene-2,2'-disulfonate
(VII-16):Disodium 4,4'-bis[4,6-di(benzothizolyl-2-thio)-pyrimidin-2-ylamino]stilbene-2,2'-disulfonate
(VII-17):Disodium 4,4'-bis[4,6-di(1-phenyltetrazolyl-2-amino)pyrimidin-2-ylamino]stilbene-2,2'-disulfonate
(VII-18):Disodium 4,4'-bis[4,6-di(naphthyl-2-oxy)-pyrimidin-2-ylamino]bibenzyl-2,2'-disulfonate Referring to the order of adding the red sensitizing dye according to the present invention and the compound (VII), either may be added first, or they may be added simultaneously. Further, the red sensitizing dye according to the present invention and the compound (VII) may be added in the from of a mixed solution.

The addition amount of the compound (VII) is within a range usually from $1 \times 10^{-6}$ to $1 \times 10^{-1}$ mol, preferably, from $5 \times 10^{-5}$ to $1 \times 10^{-2}$ mol per one mol of silver halide. A preferred addition molar ratio of the red sensitizing dye according to the present invention and the compound (VII) can be selected within a range from 1/50 to 10/1.

Although the present invention is applicable to black and white photosensitive materials, it can be applied more preferably to a multi-layered multicolor photosensitive material having at least two different spectral sensitivities on a support. The multi-layered natural color photographic materials usually have at least one red sensitive emulsion layer, at least one green sensitive emulsion layer and at least one blue sensitive emulsion layer on a support. The order of these layers may optionally selected depending on the specific photographic requirement. Although it is usual to incorporate a cyan forming coupler in the red sensitive emulsion layer, a magenta forming coupler in the green sensitive emulsion layer and a yellow-forming coupler in the blue sensitive emulsion layer, different combinations may be adopted depending on the case.

A yellow coupler, a magenta coupler and a cyan coupler that develop yellow, magenta and cyan colors, respectively, upon coupling with an oxidation product of an aromatic amine type color developer, are usually used for the color photosensitive material.

Among the yellow couplers usable in the present invention, an acylacetamide derivative such as benzoylacetanilide or pivaloylacetanilide is preferred.

Among these, those represented by the following general formulae (Y-1) and (Y-2) are preferred as the yellow coupler.

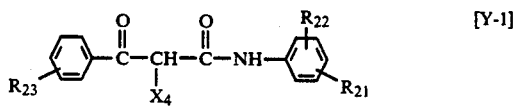

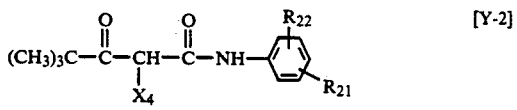

in which $X_4$ represents a hydrogen atom or a coupling eliminating group, $R_{21}$ represents a diffusion resistant group with 8 to 32 total carbon atoms, $R_{22}$ represents a hydrogen atom, a halogen atom, a lower alkyl group, a lower alkoxy group or a diffusion resistant group with 8 to 32 total carbon atoms provided that plural $R_{22}$'s can be the same or different, $R_{23}$ represents a hydrogen atom or a substituent. If there are two or more $R_{23}$'s, they may be identical or different from each other.

Typical examples of the groups as described for $X_4$, $R_{21}$, $R_{22}$ and $R_{23}$ are described in, for example, U.S. Pat. Nos. 4,622,287, 4,623,616, 3,408,194, 3,933,501, 4,046,575, 4,133,958 and 4,401,752.

Details for the pivaloylacetanilide type yellow coupler are described in, for example, U.S. Pat. Nos. 4,622,287 (column 3, line 15–column 8, line 39) and 4,623,616 (column 14, line 50–column 19, line 41).

Details for the benzoylacetanilide type yellow coupler are described in, for example, U.S. Pat. Nos. 3,408,194, 3,933,501, 4,046,575, 4,133,958 and 4,401,752.

As specific examples of pivaloylacetanilide type yellow coupler, there can be mentioned examples of the compounds (Y-1) (Y-39) described in U.S. Pat. No. 4,622,287 (columns 37–54). Among these, (Y-1), (Y-4), (Y-6), (Y-7), (Y-15), (Y-21), (Y-22) , (Y35), (Y-36), (Y-37), (Y-38), (Y-39), etc. are preferred.

Further, examples of the compounds (Y-1)–(Y-33) described in U.S. Pat. No. 4,623,616 (columns 19–24) can be mentioned. Among these, (Y-2), (Y-7), (Y-8), (Y-12), (Y-20), (Y-21), (Y-23), (Y-29), etc. are preferred.

As other preferred compounds, there can be mentioned example (34) described in U.S. Pat. No. 3,408,194

(column 6), compounds (16) and (19) described in U.S. Pat. No. 3,933,501 (column 8), compound (9) described in U.S. Pat. No. 4,046,575 (columns 7-8), compound (2) described in U.S. Pat. No. 4,133,958 (columns 5-6), compound 1 described in U.S. Pat. No. 4,401,752 (column 5), as well as the following compounds a)-g).

plers substituted at the 3-position with arylamino group or acylamino group are preferred in view of the hue and the color density of the colored dye. Typical examples are described in, for example, U.S. Pat. Nos. 2,311,082, 2,343,703, 2,600,788, 2,908,473, 3,062,653, 3,152,896 and 3,936,015. As the releasing group for the two-equivalent

| Compound | $R_{22}$ | $X_4$ |
|---|---|---|
| a | $-COOCHCOOC_{12}H_{25}$ with $CH_3$ | (hydantoin with N-phenyl, N-N-CH2-phenyl) |
| b | $-COOCHCOOC_{12}H_{25}$ with $C_4H_9$ | " |
| c | $-NHCO(CH_2)_3O-$ (aryl with $C_5H_{11}$-t, $C_5H_{11}$-t) | $O-$phenyl$-SO_2-$phenyl$-OCH_2-$phenyl |
| d | " | (thiadiazole with isopropyl, =NHSO2-tolyl) |
| e | " | (imidazole with $C_6H_{13}OCO$) |
| f | $-NHSO_2C_{12}H_{25}$ | $O-$phenyl$-COOCH(CH_3)_2$ |
| g | $-NHSO_2C_{16}H_{33}$ | (triazole with morpholino) |

Among the couplers described above, those having nitrogen atoms as the releasing atom are particularly preferred.

As the magenta coupler usable in the present invention, there can be mentioned oil protect type couplers of indazolone or cyanoacetyl series, preferably, 5-pyrazolone series and pyrazoloazole series such as pyrazolotriazoles. In the 5-pyrazolone series coupler, those cou- 5-pyrazolone series coupler, the nitrogen atom releasing group described in U.S. Pat. No. 4,310,619 and the arylthio group described in U.S. Pat. No. 4,351,897 are preferred. Further, high color density can be obtained by the 5-pyrazolone series coupler having a ballast group described in European Patent No. 73,636.

As the pyrazoloazole series coupler, there can be mentioned pyrazolobenzimidazoles described in U.S. Pat. No. 3,369,879, preferably pyrazolo[5,1-c][1,2,4]triazoles described in U.S. Pat. No. 3,725,067, pyrazolotetrazoles described in Research Disclosure No. 24220 (June, 1984) and pyrazolopyrazoles described in Research Disclosure No. 24230 (June, 1984). Any of the couplers as described above may be a polymer coupler.

These compounds are represented specifically by the following general formulae (M-1), (M-2) and (M-3).

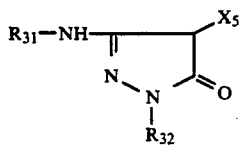
[M-1]

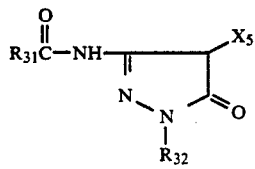
[M-2]

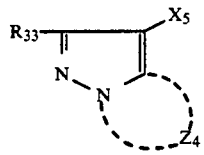
[M-3]

in which $R_{31}$ represents a diffusion resistant group with 8 to 32 total carbon atoms, $R_{32}$ represents a phenyl group or a substituted phenyl group, $R_{33}$ represents a hydrogen atom or a substituent, $Z_4$ represents a group of non-metallic atoms required for forming a 5-membered azole ring containing 2 to 4 nitrogen atoms provided that the azole ring may have a substituent (including condensed ring).

$X_5$ represents a hydrogen atom or a releasing group. Details for the substituent of $R_{33}$ and the substituents of the azole ring are described in, for example, U.S. Pat. No. 4,540,654 (column 2, line 41–column 8, line 27).

Typical examples of the groups as described for $R_{31}$ and $R_{32}$ are described in, for example, U.S. Pat. Nos. 2,311,082, 2,343,703, 2,600,788, 2,908,473, 3,062,653, 3,152,896 and 3,936,015. Preferred examples of the substituents of the phenyl group as described for $R_{32}$ include a halogen atom, an alkyl group and an alkoxy group and among these a halogen atom (particularly, a chlorine atom) is further preferred. Typical examples of the groups as described for $R_{33}$ are described in, for example, U.S. Pat. Nos. 4,310,619, and 4,351,897 and WO 88/04795.

Among the pyrazoloazole series couplers, imidazo[1,2-b]pyrazoles as described in U.S. Pat. No. 4,500,630 are preferred in view of the less yellow side absorption and light fastness of the colored dye and, pyrazolo[1,5-b]-[1,2,4]triazole as described in U.S. Pat. No. 4,540,654 is particularly preferred.

In addition, it is preferred to use a pyrazolotriazole coupler in which a branched alkyl group is directly bonded to the 2-, 3- or 6-position of the pyrazolotriazole ring as described in JP-A No. 61-65245, a pyrazoloazole coupler containing a sulfonamido group in the molecule as described in JP-A No. 61-65246, a pyrazoloazole coupler having an alkoxyphenylsulfonamido ballast group as described in JP-A No. 61-147254 and a pyrazolotriazole coupler having an alkoxy group or an aryloxy group at 6-position as described in European Patent (Laid-Open) No. 226,849.

Specific examples of these couplers are set forth below.

| Compound | $R_{33}$ | $R_{34}$ | $X_5$ |
|---|---|---|---|
| M-1 | CH₃— | —CH(CH₃)CH₂NHSO₂—[phenyl with OC₈H₁₇, NHSO₂—phenyl(OC₈H₁₇, C₈H₁₇(t))] | Cl |
| M-2 | " | —CH(CH₃)CH₂NHSO₂—[phenyl with OC₂H₄OC₆H₁₃, C₈H₁₇(t)] | " |
| M-3 | " | —CH(CH₃)CH₂NHSO₂—[phenyl with OC₈H₁₇, OC₈H₁₇] | —O—C₆H₄—CH₃ |

-continued

| Compound | $R_{33}$ | $R_{34}$ | $X_5$ |
|---|---|---|---|
| M-4 | 2-methoxyphenyl-O— | 3-methylphenyl-NHSO$_2$-(2-OC$_8$H$_{17}$, 5-C$_8$H$_{17}$(t))phenyl | —S-(2-OC$_4$H$_9$, 5-C$_8$H$_{17}$(t))phenyl |
| M-5 | CH$_3$— | —CH(CH$_3$)CH$_2$NHSO$_2$-[2-OC$_2$H$_4$OC$_2$H$_5$, 5-(NHSO$_2$-(2-OC$_8$H$_{17}$, 5-C$_8$H$_{17}$(t))phenyl)]phenyl | Cl |
| M-6 | " | —C(CH$_3$)$_2$CH$_2$NHSO$_2$-[2-OC$_8$H$_{17}$, 5-(NHSO$_2$-(2-OC$_8$H$_{17}$, 5-C$_8$H$_{17}$(t))phenyl)]phenyl | " |
| M-7 | phenyl-OCH$_2$CH$_2$O— | —CH$_2$CH$_2$NHSO$_2$-[2-O-(4-OCH$_3$)phenyl, 5-(NHSO$_2$-(2-OC$_8$H$_{17}$, 5-C$_8$H$_{17}$(t))phenyl)]phenyl | —S-(2-OC$_4$H$_9$, 5-C$_8$H$_{17}$(t))phenyl |
| M-8 | CH$_3$CH$_2$O— | " | " |
| M-9 | (2-OC$_8$H$_{17}$, 5-C$_8$H$_{17}$(t))phenyl-SO$_2$NH-(4-O(CH$_2$)$_2$O—)phenyl | 3,4-dichlorophenyl | |

$$\begin{array}{c} R_{33}\!\!-\!\!\overset{X_5}{\underset{N-N}{\diagup}}\!\!\diagdown \\ \phantom{xxxxx}\diagup\!\!\diagdown\!\!NH \\ R_{34}\phantom{xxx}N \end{array}$$

| Compound | $R_{33}$ | $R_{34}$ | $X_5$ |
|---|---|---|---|
| M-10 | 2-methoxyphenyl-O— | —CH(CH$_3$)CH$_2$NHSO$_2$-(2-OC$_8$H$_{17}$(n), 5-C$_8$H$_{17}$(t))phenyl | Cl |
| M-11 | CH$_3$— | HO-phenyl-SO$_2$-phenyl-O-CH(C$_{10}$H$_{21}$)CONH-phenyl-(CH$_2$)$_3$— | Cl |
| M-12 | " | (n)C$_6$H$_{13}$, (n)C$_8$H$_{17}$-CHCH$_2$SO$_2$-(CH$_2$)$_2$— | " |
| M-13 | (CH$_3$)$_2$CH— | (2-OC$_4$H$_9$, 5-C$_8$H$_{17}$(t))phenyl-SO$_2$-(CH$_2$)$_3$— | " |

| Compound | $R_{33}$ | $R_{34}$ | $X_5$ |
|---|---|---|---|
| M-14 | $+CH-CH_2)_{50}+CH_2-C)_{50}$ with COOCH$_2$CH$_2$OCH$_3$ and CONH—, CH$_3$ | CH$_3$—CH— / CH$_2$NHSO$_2$CH$_3$ | " |
| M-15 | C$_6$H$_5$—O— | (CH$_2$)$_2$NHSO$_2$—Ar(OC$_8$H$_{17}$, C$_8$H$_{17}$(t)) | Cl |
| M-16 | 3-Cl-C$_6$H$_4$—O— | (CH$_2$)$_2$NHSO$_2$—Ar(OC$_8$H$_{17}$, C$_8$H$_{17}$(t)) | —S—Ar(OC$_4$H$_9$, C$_8$H$_{17}$(t)) |

As the cyan coupler, a phenol series cyan coupler and a naphthol series cyan coupler are most typical.

As the phenol series cyan coupler, there are those having an acylamino group at 2-position and an alkyl group at 5-position of the phenol nucleus (including polymer coupler) as described in, for example, U.S. Pat. Nos. 2,369,929, 4,518,687, 4,511,647 and 3,772,002, and typical examples thereof are the coupler of Example 2 described in Canadian Patent No. 625,882, compound (1) described in U.S. Pat. No. 3,772,002, compounds ( -4) and (-5) described in U.S. Pat. NO. 4,564,590, compounds (1), (2), (3), and (24) described in JP-A No. 61-39045, and compound (C-2) described in JP A No. 62-70846.

As the phenol series cyan coupler, there are also 2,5-diacylaminophenyl series couplers as described, for example, in U.S. Pat. Nos. 2,772,162, 2,895,826, 4,334,011 and 4,500,653 and in JP-A No. 59-164555.

Typical examples thereof are compound (V) described in U.S. Pat. No. 2,895,826, compound (17) described in U.S. Pat. No. 4,557,999, compounds (2) and (12) described in U.S. Pat. No. 4,565,777, compound (4) described in U.S. Pat. No. 4,124,396 and compound (I-19) described in U.S. Pat. No. 4,613,564.

As the phenol series cyan coupler, there are those in which a nitrogen-containing heterocyclic ring is condensed to a phenol nucleus as described in, for example, U.S. Pat. Nos. 4,327,173, 4,564,586 and 4,430,423, JP-A No. 61-390441 and Japanese Patent Application No. 100222/86. As typical examples of them, there can be mentioned couplers (1) and (3) described in U.S. Pat. No. 4,327,173, compounds (3) and (16) described in U.S. Pat. No. 4,564,586, compounds (1) and (3) described in U.S. Patent 4,430,423, as well as the compounds illustrated below.

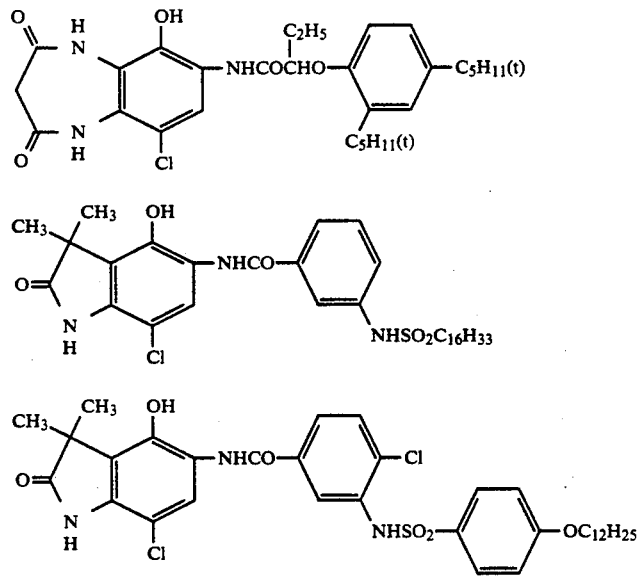

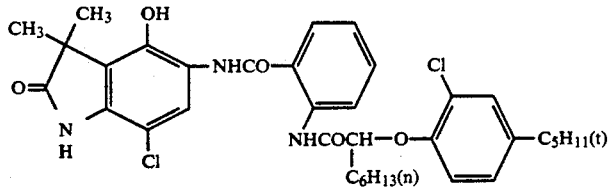

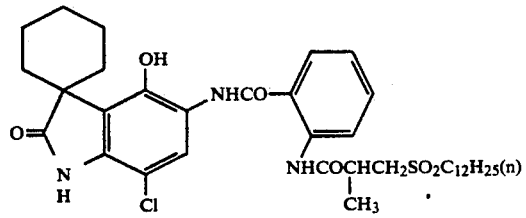

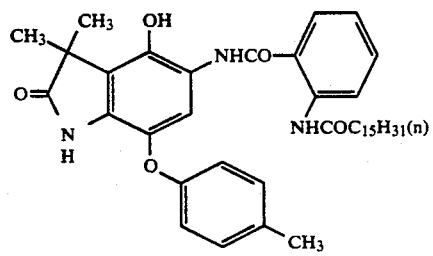

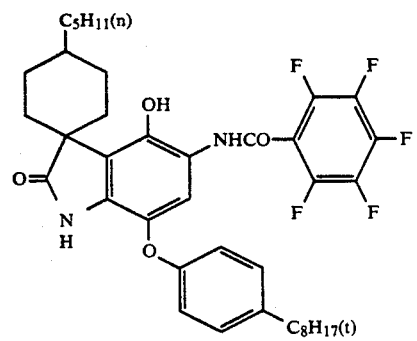

The phenol series coupler can further include those ureido series couplers described in, for example, U.S. Pat. Nos. 4,333,999, 4,451,559, 4,444,872, 4,427,767 and 4,578,813, and in European Patent (EP) No. 067,689B1. As typical examples of them, there can be mentioned coupler (7) described in U.S. Pat. No. 4,333,999; coupler (1) described in U.S. Pat. No. 4,451,559; coupler (14) described in U.S. Pat. No. 4,444,872; coupler (3) described in U.S. Pat. No. 4,427,767; couplers (6) and (24) described in U.S. Pat. No. 4,609,619; couplers (1) and (11) described in U.S. Pat. No. 4,579,813; couplers (45) and (50) described in European Patent (EP) No. 067,689B1 and coupler (3) described in JP-A No. 61-42658.

As the naphthol series cyan couplers, there are those having an N-alkyl-N-arylcarbamoyl group at 2-position of the naphthol nucleus (as described, for example, in U.S. Pat. 2,313,586); those having an alkyl carbamoyl group at 2-position (described in, for example, U.S. Pat. Nos. 2,474,293 and 4,282,312); those having an aryl carbamoyl group at 2-position (for example, JP-B No. 50-14523); those having a carbonamido or sulfonamido group at 5-position (for example, JP-A No. 60-237448, JP-A No. 61-145557 and JP-A No. 61-153640); those having an aryloxy releasing group (for example, in U.S. Pat. No. 3,476,563); those having a substituted alkoxy releasing group (for example in U.S. Patent 4,296,199); and those having a glycolic acid releasing group (for example, in JP-B No. 60-39217).

The photosensitive material prepared by using the present invention may also contain a hydroquinone derivative, an aminophenol derivative, gallic acid derivative or an ascorbic acid derivative as an anti-color foggant.

In addition, catechol derivatives as described, for example, in JP-A No. 59-125732 and JP-A No. 60-262159 may also be used as a dye image stabilizer.

The photosensitive material prepared by using the present invention may contain a UV-ray absorber in a hydrophilic colloid layer. There can be mentioned, for example, an aryl group-substituted benzotriazole compound (described, for example, in U.S. Pat. No. 3,533,794); a 4-thiazolidone compound (described, for example, in U.S. Pat. Nos. 3,314,794 and 3,352,681); a benzophenone compound (described, for example, in JP-A No. 46-2784); a cinnamic ester compound (descried, for example, in U.S. Pat. Nos. 3,705,805 and 3,707,375); a butadiene compound (described, for example, in U.S. Pat. No. 4,045,229); or a benzoxidol compound (described, for example, in U.S. Pat. No. 3,700,455). A UV absorbing coupler (for example, α-naphthol series cyan dye-forming coupler) or a UV-absorbing polymer may also be used. These UV-absorbants may be added to a specific layer.

The photosensitive material prepared by using the present invention may contain in its hydrophilic colloid layer, a water-soluble dye as a filter dye or for other various purposes such as anti-irradiation. The dye can include oxonol dye, hemioxonol dye, styryl dye, merocyanine dye, cyanine dye and azo dye. Among them, oxonol dye, hemioxonol dye and merocyanine dye are preferred.

While gelatin is advantageously used for the binder or the protection colloid that can be used in the emulsion layer of the photosensitive material according to the present invention, other hydrophilic colloids may be used alone or in combination with gelatin.

Gelatin used in present invention may either be treated with lime or an acid. Details for the manufacturing method of gelatin are described in "The Macromolecular Chemistry of Gelatin", written by Arthur Vice, published by Academic Press in 1964.

The support used in the present invention can include those usually employed for photographic material such as cellulose nitrate film, cellulose acetate film, cellulose acetate butyrate film, cellulose acetate propionate film, polystyrene film, polyethyelne terephthalate film, polycarbonate film, as well as laminates thereof, thin glass film, paper, etc. Satisfactory results can be obtained also with supports such as paper coated or laminated with baryta or α-olefin polymer, particularly, α-olefin polymer with from 2 to 10 carbon atoms such as polyethyelne, polypropylene and ethylene-butene copolymer, vinyl chloride resin containing a reflection material such as $TiO_2$, plastic film having improved bonding characteristics obtained by roughening the surface as shown in JP-B No. 47-19068. In addition, UV-ray curable resins may also be used.

Transparent or opaque supports may be selected depending on the purpose of the photosensitive material. In addition, a dye or pigment may be added to prepare a colored transparent support.

The opaque support can include those materials which are opaque by nature such as paper, as well as those transparent films having incorporated therein a dye or a pigment such as titanium oxide, and plastic films surface treated by the method described in JP-B No. 47-19068. The support is usually applied with a subbing layer. For further improving the bonding characteristics, the surface of the support may be pre-treated with corona discharge, UV-ray irradiation or a flaming treatment.

As the color photosensitive material that can be applied to the preparation of color photography according to the present invention, usual color photosensitive materials, particularly, color photosensitive materials for printing use are preferred.

For the development of the photosensitive material in accordance with the present invention, a black and white developing solution and/or color developing solution is used. The color developer is preferably an aqueous alkaline solution containing an aromatic primary amine color developing agent as the main ingredient. As the color developing agent, while aminophenol series compounds are useful, p-phenylenediamine series compounds are preferably used and, as typical examples thereof, there methyl-4-amino-N-ethyl-N-8-hydroxyethylaniline, 3-methyl-4-amino-N-ethyl-N-β-methanesulfonamidoethylaniline, 3-methyl-4-amino-N-ethyl-N-β-methoxyethylaniline, as well as sulfate, hydrochloride or p-toluene sulfonate thereof. Two or more of these compounds may be used together depending on the purpose.

The color developer generally contains a pH buffer such as an alkali metal carbonate, borate or phosphate; and a development restrainer or an antifogging agent such as a bromide, iodide, benzimidazoles, benzothiazoles or mercapto compounds. If required, there can also be used various preservatives such as hydroxylamine, diethylhydroxylamine, sulfite hydrazines, phenyl semicarbazide, triethanolamine, catechol sulfonates, triethylenediamine(1,4-diazabicyclo[2,2,2]octane); organic solvents such as ethylene glycol and diethylene glycol; development accelerators such benzyl alcohol, polyethylene glycol, quaternary ammonium salt and amines; dye-forming couplers; competitive couplers; fogging agents such as sodium borohydride; auxiliary developing agents such as 1-phenyl-3-pyrazolidone; tackifiers; and various chelating agents represented by aminopolycarboxylic acid, aminopolyphosphonic acid, alkyl-phosphonic acid and phosphonocarboxylic acid, for example, ethylenediaminetetraacetic acid, nitrotriacetic acid, diethylenetriaminepentaacetic acid, cyclohexadiaminetetraacetic acid, hydroxylethyliminodiacetic acid, 1-hydroxyethylidene-1,1-diphosphonic acid, nitrilo-N,N,N-trimethylenephosphonic acid, ethylenediamine-N,N,N',N'-tetramethylenephosphonic acid, ethylenediamined(o-hydroxyphenylacetic acid) and salts thereof as typical examples.

In the case of practicing the reversal process, color development is usually conducted after black and white development. For the black and white developer, known black and white developing agents such as dihydroxy benzenes, e.g., hydroquinone; 3-pyrazolidones, e.g., 1-phenyl-2-pyrazolidone, or aminophenols, e.g., N-methyl-paminophenol, which can be used alone or in combination.

The pH value of these color developers and black and white developers is generally from 9 to 12. Further, the replenishing amount of these developers, although depending on the color photographic material to be processed, is generally less than 3 liters per one square meter of the photosensitive material, and it may be decreased to at most 500 ml by reducing the bromide ion concentration in the replenishing solution. In the case of decreasing the replenishing amount, it is preferred to prevent the evaporation of the solution and air oxidation by reducing the area of contact with the air in the processing bath. In addition, the replenishing amount can also be decreased by using means for suppressing the accumulation of bromide ions in the developer, for example, providing a bromide ion-exchange resin layer on the back surface of support.

The photographic emulsion layer, after the color development, is usually subjected to bleaching. The bleaching may be performed simultaneously with the fixing treatment (bleach-fixing treatment) or may be conducted separately. Further, for conducting the treatment rapidly, bleach-fixing treatment may be performed after bleaching. Furthermore, processing can be optionally performed in two successive bleach-fixing baths, where fixing is performed before bleach-fixing process or where bleaching is performed after bleach-fixing process depending on the purpose. As the bleaching agent, there can be used, for example, compounds of polyvalent metals such as iron (III), cobalt (III), chromium (IV) and copper (II), peracids, quinones and nitro compounds. As typical bleaching agents, there can be used ferricyanates; bichromate; complex salts of iron (III) or cobalt (III) of organic acids such as aminocarboxylic acids, for example, ethylenediaminetetraacetic acid, diethylenetriaminepentaacetic acid, cyclohexanediaminetetraacetic acid, methyliminodiacetic acid, 1,3-diaminopropanetetraacetic acid and glycoletherdiamineteraacetic acid, or citric acid, tartaric acid and maleic acid; persulfates; bromates; permanganate; nitrobenzenes, etc. Among them, complex salts of iron (III) aminopolycarboxylate including the complex salt of iron (III) ethylenediaminetetraacetate and persulfates are preferred in view of the rapid processing and prevention of environmental pollution. Furthermore, the complex salt of iron (III) aminopolycarboxylate is useful both in the bleaching solution and in the bleach-fixing solution. The pH value in the bleaching solution or bleach-fixing solution using the complex salt of iron (III) aminopolycarboxylate is usually from 5.5 to 8 and an even lower pH is possible for rapid processing.

Bleaching accelerators can be added as required to the bleaching solution, bleach-fixing solution and the preceding bath thereto. Specific examples of useful bleaching accelerators are described in the following patent specifications. Those compounds having a mercapto group or disulfide group as described in, for example, U.S. Pat. No. 3,893,858, West German Patent Nos. 1,290,812 and 2,059,988, JP-A Nos. 53-32736, 53-57831, 53-37418, 53-72623, 53-95630, 53-95631, 53-104232, 53-124424, 53-141623 and 53-28426, and *Research Disclosure* No. 17129 (July, 1978); thiazolizine derivatives as described in JP-A No. 50-140129; thiourea derivatives as described in JP-B No. 45-8506, JP-A No. 52-20832 and JP-A No. 53-32735 and U.S. Pat. No. 3,706,561; iodides as described in West German Patent No. 1,127,715 and JP-A No. 58-16235; polyoxyethylene compounds as described in West German Patent Nos. 966,410 and 2,748,430; the polyamine compounds as described in JP-B No. 45-8836, as well as those compounds as described in JP-A Nos. 49-42434, 49-59644, 53-94927, 54-35727, 55-26506 and 58-163940; and iodide ions can be used. Among all, the compounds having the mercapto group or the disulfide group are preferred in view of high accelerating effect and, particularly, those compounds described in U.S. Pat. No. 3,893,858, West German Patent No. 1,290,812 and JP-A No. 53-95630 are preferred. Further, the compounds as described in U.S. Pat. No. 4,552,834 are also preferred. These bleaching accelerators may be added in the photosensitive material. These bleaching accelerators are particularly effective for bleach-fixing the color photographic material for taking photographs.

As the fixing agent, while thiosulfates, thiocyanates, thioether series compounds, thiroureas, a great amount of iodide, etc. can be mentioned, thiosulfates, particularly ammonium thiosulfate, are generally used. As the preservative for the bleach-fixing solution, sulfites, bisulfites or carbonyl bisulfite adducts are preferred.

The silver halide color photosensitive material according to the present invention is usually subjected to a water washing and/or stabilizing step after desilvering process. The amount of washing water in the water washing step can be set within a wide range depending on the characteristics of the photosensitive material (for example, depending on the material used such as coupler), application uses and further, various conditions such as temperature of washing water, number (step) of water washing vessels, replenishing systems such as counter-current or forward current system, etc. Among them, the relationship between the number of washing vessels and the amount of water in a multistage countercurrent system can be determined by the method as described in "Journal of the Society of Motion Picture and Television Engineers", vol. 64, p. 248-253 (May, 1955).

According to the multistage countercurrent system described in the literature above, although the amount of washing water can be remarkably decreased, there is increased propagation of bacteria due to the increase of the water staying time in the vessels which causes a problem in that they become deposited on the photosensitive material, etc. In the processing of the color photosensitive material according to the present invention, a method as described in Japanese Patent Application No. 61-131632 for reducing calcium ions and magnesium ions can be used extremely effectively as a countermeasure for this problem. In addition, isothiazolone compounds, thiabendazoles, chlorosterilizers such as chlorinated sodium isocyanurate as described in JP-A No. 57-8542, as well as those sterilizers e.g., benzotriazole, as described in "Chemistry of Antibacterial and Anti-Mould Agent" written by Hiroshi Horiguchi, "Bacterio-Static, Sterilizing and Anti-Mould Technique for Microorganisms", edited by The Society of Sanitation Technology, "Encyclopedia of Anti-bacteria and Anti-Mould Agents" edited by Anti-Bacteria and Anti-Mould Society of Japan, are useful.

The pH of the washing water in the processing of the photosensitive material according to the present invention is from 4 to 9, preferably, from 5 to 8. The temperature for the washing water and the time for water washing can also be set variously depending on the characteristics, application uses of the photosensitive material, etc. and a range from 20 sec to 10 min at 15°-45° C., preferably, from 30 sec to 5 min. at 25°-40 ° C. is preferred. Further, the photosensitive material according to the present invention can be processed directly with a stabilizing solution instead of water washing as described above. In such a stabilizing process, any of the known methods as described in JP-A Nos. 57-8543, 58-14834 and 60-220345 can be used.

Further, there is a case in which a stabilizing process is also performed after the washing process and as an example, there can be mentioned a stabilizing bath containing formalin and surface active agent which is used as the final bath for the color photosensitive material for taking photographs. Various kinds of chelating agents and anti-mould agents can be added also to this stabilizing bath.

The overflow solution accompanying replenishment of the washing and/or replenishment of the stabilizing solution can be used again in other steps such as a desilvering step.

A color development agent may be incorporated into the silver halide color photosensitive material according to the present invention with an aim of simplifying and speeding-up the processing. For the incorporation, various precursors for the color developing agent may preferably be used. There can be mentioned, for example, indoaniline series compounds as described in U.S. Pat. No. 3,342,597; Schiff base compounds as described in U.S. Pat. No. 3,342,599 and *Research Disclosure* Nos.

14850 and 15159; aldol compounds as described in the *Research Disclosure* No. 13924; metal salt complexes as described in U.S. Pat. No. 3,719,492; and urethane compounds as described in JP-A No. 53-135628.

Various kinds of 1-phenyl-3-pyrazolidons may be incorporated in the silver halide color photosensitive material according to the present invention as required with an aim of accelerating the color development. Typical compounds are described in, for example, JP-A Nos. 56-64339, 57-144547 and 58-115438.

Each of the processing solutions in the present invention is used at a temperature of from 10° C. to 50° C. A temperature of 33° C. to 38° C. is usually standard, but it is possible to accelerate the processing and shorten the processing time at a higher temperature or, on the contrary, to attain an improvement for the image quality or the stabilization of the processing solution at a lower temperature. Further, treatment using cobalt intensification, hydrogen peroxide intensification as described in West German Patent No. 2,226,770 or U.S. Pat. No. 3,674,499 may be applied for saving the amount of silver in the photosensitive material.

In order to fully attain the excellent advantages of the silver halide photographic material according to the present invention, it is preferred to apply processing to a silver halide color photographic material having, on a reflecting support, at least one photosensitive layer containing silver halide grains according to the present invention and at least one coupler that forms a dye through the coupling reaction with an oxidation product of an aromatic primary amine color development agent, in a color developer containing substantially no benzyl alcohol and containing bromide ions of at most 0.002 mol/liter for a developing time of at most 2 min and 30 seconds.

"Containing substantially no benzyl alcohol" described above means an amount of at most 2 ml, preferably, less than 0.5 ml, most preferably, no benzyl alcohol at all per 1 liter of the color developer.

According to the present invention, it is possible to obtain silver halide photographic material with less fluctuation of photographic sensitivity depending on the printing temperature and with less fluctuation of photo graphic sensitivity due to long term storage under the normal condition.

The invention will now be described with reference to the following examples. Unless otherwise indicated, all parts, percents, ratios, etc. are by weight.

EXAMPLE 1

32 g of lime-treated gelatin was added to 1000 cc of distilled water and, after dissolution at 40° C., 3.3 g of sodium chloride was added and temperature was elevated to 60° C. 3.2 cc of N,N'-dimethylimidazolizin-2-thione (as aqueous 1% solution) were added to the thus prepared solution. Then, a solution containing 32.0 g of silver nitrate dissolved in 200 cc of distilled water and a solution containing 15.7 g of potassium bromide and 3.3 g of sodium chloride dissolved in 200 cc of distilled water were admixed with the above-mentioned solution for 15 min while keeping the temperature at 60° C. Further, a solution containing 128.0 g of silver nitrate dissolved in 560 cc of distilled water and a solution containing 62.8 g of potassium bromide and 13.2 g of sodium chloride dissolved in 560 cc of distilled water were admixed with the thus prepared solution for 20 min while keeping the temperature at 60° C. After the addition of the aqueous solution of silver nitrate and the aqueous solution an alkali halide was completed, the temperature was lowered to 40° C. and desalting and water washing were applied. 90.0 g of lime-treated gelatin were further added and, after adjusting pAg to 7.2 by using sodium chloride, 60.0 mg of a red sensitive sensitizing dye (S-1) and 2.0 mg of triethylthiourea were added and chemical sensitization was optimally applied at 58° C. The thus obtained silver bromochloride emulsion (70 mol % of silver bromide content) was referred to as Emulsion A-1.

An emulsion, different from the Emulsion A-1 only in that the red sensitizing dye added before the chemical sensitization was changed from (S-1) to (I-3), was prepared and referred to as Emulsion A 2.

Then, 32 g of lime-treated gelatin were added to 1000 cc of distilled water and, after dissolution at 40° C., 3.3 g of sodium chloride were added and temperature was elevated to 60° C. 3.2 cc of N,N'-dimethylimidazolizin-2-thione (as aqueous 1% solution) were added to the thus prepared solution. Then, a solution containing 32.0 g of silver nitrate dissolved in 200 cc of distilled water and a solution containing 9.0 g of potassium bromide and 6.6 g of sodium chloride dissolved in 200 cc of distilled water were admixed with the above-mentioned solution for 12 min while keeping the temperature at 60° C. Further, a solution containing 128.0 g of silver nitrate dissolved in 560 cc of distilled water and a solution containing 35.9 g of potassium bromide and 26.4 g of sodium chloride dissolved in 560 cc of distilled water were admixed with the thus prepared solution for 20 min while keeping the temperature at 60° C. After the addition of the aqueous solution of silver nitrate and the aqueous solution of alkali halide was completed, the temperature was lowered to 40° C. and desalting and water washing treatment was applied. 90.0 g of lime-treated gelatin were further added and, after adjusting pAg to 7.2 by using sodium chloride, 60.0 mg of the red sensitizing dye (S 1) and 2.0 mg of triethylthiourea were added and chemical sensitization was optimally applied at 58° C. The thus obtained silver bromochloride emulsion (40 mol % of silver bromide content) was referred to as Emulsion B-1.

An emulsion, different from the Emulsion B-1 only in that the red sensitizing dye added before the chemical sensitization was changed from (S-1) to (I-3), was prepared and referred to as Emulsion B-2.

Then, 32 g of lime-treated gelatin were added to 1000 cc of distilled water and, after dissolution at 40° C., 3.3 g of sodium chloride were added and temperature was elevated to 60° C. 3.2 cc of N,N'-dimethylimidazolizin-2-thione (as aqueous 1% solution) were added to the thus prepared solution. Then, a solution containing 32.0 g of silver nitrate dissolved in 200 cc of distilled water and a solution containing 11.0 g of sodium chloride dissolved in 200 cc of distilled water were admixed with the above-mentioned solution for 8 min while keeping the temperature at 60° C. Further, a solution containing 128.0 g of silver nitrate dissolved in 560 cc of distilled water and a solution containing 44.0 g of sodium chloride dissolved in 560 cc of distilled water were admixed with the thus prepared solution for 20 min while keeping the temperature at 60° C. After the addition of the aqueous solution of silver nitrate and the aqueous solution of alkali halide was completed, the temperature was lowered to 40° C. and desalting and water washing treatment was applied. 90.0 g of lime-treated gelatin were further added and, after adjusting pAg to 7.2 by using sodium chloride, 60.0 mg of the red sensitizing dye (S-1) and 2.0 mg of triethylthiourea were added and the chemical sensitization was optimally applied at 58° C. The thus obtained silver chloride emulsion was referred to as Emulsion C-1.

An emulsion, different from the Emulsion C-1 only in that the red sensitizing dye added before chemical sensitization was changed from (S-1) to (I-3), was prepared and referred to as Emulsion C-2.

Then, 32 g of lime-treated gelatin were added to 1000 cc of distilled water and, after dissolution at 40° C., 3.3 g of sodium chloride were added and temperature was elevated to 60° C. 3.2 cc of N,N'-dimethylimidazolizin-2-thione (as aqueous 1% solution) were added to the thus prepared solution. Then, a solution containing 32.0 g of silver nitrate dissolved in 200 cc of distilled water and a solution containing 11.0 g of sodium chloride dissolved in 200 cc of distilled water were admixed with the abovementioned solution for 8 min while keeping the temperature at 60° C. Further, a solution containing 125.6 g of silver nitrate dissolved in 560 cc of distilled water and a solution containing 41.0 g of sodium chloride dissolved in 560 cc of distilled water were admixed with the thus prepared solution for 20 min while keeping the temperature at 60° C. One min after the completion of the addition of the aqueous solution of silver nitrate and the aqueous solution of alkali halide, 60.0 mg of the red sensitizing dye (S-1) were added. After keeping the temperature at 60° C. for 10 min, the temperature was lowered to 40° C. and, further, a solution containing 2.4 g of silver nitrate dissolved in 20 cc of distilled water and a solution containing 1.35 g of potassium bromide and 0.17 g of sodium chloride dissolved in 20 cc of distilled water were admixed with the thus prepared solution for 5 min while keeping the temperature at 40° C. and then desalting and water washing treatment was applied. 90.0 g of lime-treated gelatin were further added and, after adjusting pAg to 7.2 by using sodium chloride, 2.0 mg of triethylthiourea were added and the chemical sensitization was optimally applied at 58° C. The thus obtained silver bromochloride emulsion (silver bromide content: 1.2 mol %) referred to as Emulsion D-1.

An emulsion, different from the Emulsion D-1 only in that the red sensitizing dye added before the chemical sensitization was changed from (S-1) to (I-3), was prepared and referred to as Emulsion D-2.

For the eight silver halide emulsions from A-1 to D-2 thus prepared, the shape, the size and the size distribution of the grains were determined by electron microscopic photograph. All of the silver halide grains contained in the emulsions A-1 to D 2 were cubic grains. The grain size was expressed by the average value for the diameter of a circle equivalent with the projected area of the grain, while the grain size distribution was expressed by using a value obtained by dividing the standard deviation of the grain diameter by the average grain size. Further, by determining X-ray diffraction of the silver halide crystals, the halogen composition of the emulsion grains was determined. These results are shown in Table 1.

$E_R = -1.245V$

TABLE 1

| Emulsion | Shape | Grain size | Size distribution | Analysis for halogen composition in AgClBr emulsion by X-ray diffractometry |
|---|---|---|---|---|
| A-1 | Cubic | 0.51 μm | 0.10 | AgCl; 30% homogenous |
| A-2 | Cubic | 0.51 μm | 0.10 | AgCl; 30% homogenous |
| B-1 | Cubic | 0.50 μm | 0.09 | AgCl; 60% homogenous |
| B-2 | Cubic | 0.50 μm | 0.09 | AgCl; 60% homogenous |
| C-1 | Cubic | 0.52 μm | 0.08 | AgCl; 100% homogenous |
| C-2 | Cubic | 0.52 μm | 0.08 | AgCl; 100% homogenous |
| D-1 | Cubic | 0.52 μm | 0.08 | Comprising AgCl 100% phase and AgBr 10-39% localized phase |
| D-2 | Cubic | 052 μm | 0.08 | Comprising AgCl 100% phase and AgBr 10-39% localized phase |

To each of the Emulsions A-1 through D-2, 125 mg of the compound (IV-30) per one mol of the silver halide and 20 mol of the compound (VII-15) per one mol of the red sensitizing dye were added, which was mixed and dissolved with an emulsified dispersion containing a cyan coupler. The solution was coated, in the composition as shown in Table 2, onto a paper support laminated on both sides with polyethylene, to prepare each of photosensitive materials A-1 through D-2. Sodium 1-oxy-3,5-dichloro-s-triazine was used as the gelatin hardener.

TABLE 2

| Layer | Main composition | Amount used |
|---|---|---|
| Second layer (protection layer) | Gelatin | 1.50 g/m² |
| First layer (red sensitive layer) | Silver halide emulsion | 0.24 g/m² |
| | Gelatin | 0.96 g/m² |
| | Cyan coupler (a) | 0.38 g/m² |
| | Color image stabilizer (b) | 0.17 g/m³ |
| | Solvent (c) | 0.23 cc/m² |
| Support | Polyethylene-laminated paper (containing TiO₂ and ultramarine blue in polyethylene on the side of first layer) | |

Silver halide emulsion represents the coating amount converted as silver (a) cyan coupler

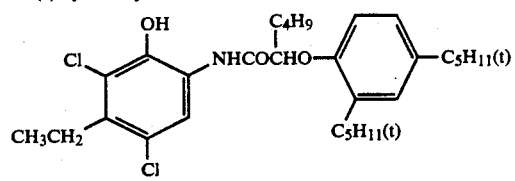

(b) Color image stabilizer

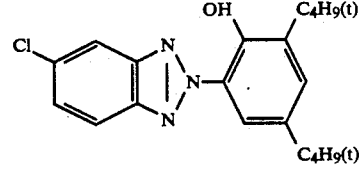

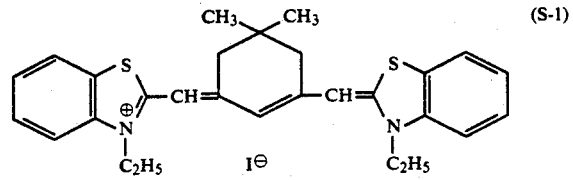

(S-1)

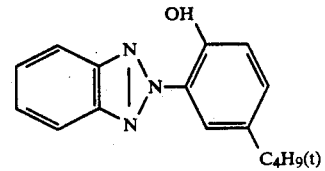

and

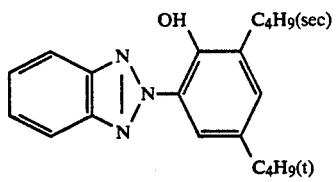

as 1:3:3 mixture (molar ratio)

(c) solvent

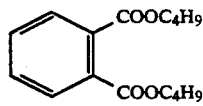

The range of fluctuation in photographic sensitivity depending on the change in the printing temperature and the range in fluctuation of photographic sensitivity due to the long term storage under the normal condition were tested for the thus obtained eight types of coated sample as described below.

For evaluating the fluctuation range in photographic sensitivity depending on the change in the printing temperature, the temperature and the humidity of each of the coated samples were kept at 15° C.-55% and 35° C.-55% and exposed for 0.5 sec through an optical wedge and a red filter. Successively, color development was conducted in the developing step using the liquid developer described below. For evaluating the fluctuation range in photographic sensitivity due to long term storage under the normal condition, each of the coated samples was stored under the conditions of 30° C.-40% for 3 months and, after keeping the coated samples at 15° C.-55% before exposure, the same exposure and development were conducted.

The reflection density of the thus prepared and treated samples was measured to obtain characteristic curves. As the evaluation for the range of fluctuation in photographic sensitivity depending on the change in the printing temperature, the density change ΔD (temperature) by the exposure at 35° C.-55% with such an exposure amount as giving 1.0 of optical density when exposed at 15° C.-55%, was read. As an evaluation for the range of fluctuation in photographic sensitivity due to long term storage under the normal condition, the density change ΔD (aging) in the coated and aged samples with such an exposure amount as giving 1.0 of optical density when exposing the coated sample at 15° C.-55%, which was not stored, was read. These results are shown in Table 3.

| Processing step | Temperature | Time |
|---|---|---|
| Color development | 35° C. | 45 sec |
| Bleach-Fixing | 30-35° C. | 45 sec |
| Rinsing (1) | 30-35° C. | 20 sec |
| Rinsing (2) | 30-35° C. | 20 sec |
| Rinsing (3) | 30-35° C. | 20 sec |
| Rinsing (4) | 30-35° C. | 30 sec |
| Drying | 70-80° C. | 60 sec |

(4-vessel countercurrent system from rinsing (4) to rinsing (1) was employed)

The composition for each of the processing solutions is as follows.

| Color developer | |
|---|---|
| Water | 800 ml |
| Ethylenediamine-N,N,N,N-tetramethylene phosphonic acid | 1.5 g |
| Triethylenediamine(1,4-diazabicyclo [2,2,2]octane) | 5.0 g |
| Sodium chloride | 1.4 g |
| Potassium carbonate | 25 g |
| N-ethyl-N-(β-methanesulfonamidoethyl)-3-methyl-4-aminoaniline sulfate | 5.0 g |
| N,N-diethylhydroxylamine | 4.2 g |
| Brightening agent (a diaminostylben derivative) (UVITEX CK, manufactured by Ciba Geigy Co.) | 2.0 g |
| made up with water to | 1000 ml |
| pH (25° C.) | 10.10 |
| Bleach-fixing solution | |
| Water | 400 ml |
| Ammonium thiosulfate (70%) | 100 ml |
| Sodium sulfite | 18 g |
| Ammonium ethylenediaminetetraacetato ferrate | 55 g |
| Disodium ethylenediaminetetraacetate | 3 g |
| Ammonium bromide | 40 g |
| Glacial acetic acid | 8 g |
| made up with water to | 1000 ml |
| pH (25° C.) | 5.5 |

Rinsing solution

Ion-exchanged water (each at most 3 ppm of calcium and magnesium).

TABLE 3

| Photosensitive material | AgCl content of emulsion | Sensitizing dye | ΔD (temperature) | ΔD (aging) | Remarks |
|---|---|---|---|---|---|
| A-1 | 30 mol %; homogenous | (S-1) | 0.08 | −0.15 | Comparative Example |
| A-2 | 30 mol %; homogenous | (I-3) | 0.04 | −0.19 | Comparative Example |
| B-1 | 60 mol %; homogenous | (S-1) | 0.10 | −0.10 | Comparative Example |
| B-2 | 60 mol %; homogenous | (I-3) | 0.06 | −0.10 | Comparative Example |
| C-1 | 100 mol %; homogenous | (S-1) | 0.38 | −0.09 | Comparative Example |
| C-2 | 100 mol %; homogenous | (I-3) | 0.05 | −0.04 | This invention |
| D-1 | 98.8 mol % in average (localized phase of high silver bromide content) | (S-1) | 0.24 | −0.07 | Comparative Example |
| D-2 | 98.8 mol % in average (localized phase of high silver bromide content) | (I-3) | 0.03 | −0.03 | This invention |

As apparent from the results, the high silver chloride emulsion containing the red sensitizing dye and the nitrogen-containing heterocyclic compound disclosed by the present invention shows unexpectedly and remarkably small fluctuation range of photographic sensitivity depending on the change in the printing temperature and fluctuation range of photographic sensitivity due to long term storage under the normal condition.

EXAMPLE 2

Emulsions identical with Emulsions D-1 and D-2 shown in Example 1 were prepared except that the red sensitizing dye to be added during formation of the grains were changed as shown in Table 4, and they were referred to as Emulsions D-3 through D-9.

125 mg of the compound (IV-30) were added to each of Emulsions D-3 through D-9 per one mol of the silver halide, which was coated in the same manner as in Example 1 to prepare each of photosensitive materials D-3 through D-9.

The fluctuation range of photographic sensitivity depending on the change in the printing temperature and the fluctuation range of photographic sensitivity due to long term storage under the normal condition of the thus obtained coated samples were evaluated for $\Delta D$ (temperature) and $\Delta D$ (aging) by the same procedures as described in Example 1. The results are shown in Table 4.

EXAMPLE 3

Photosensitive materials identical with the photosensitive material D-8 as prepared in Example 2 were prepared excepting that the kind and the amount of the nitrogen-containing heterocyclic compounds added in the emulsion were changed as shown in Table 5, and they were referred to as Photosensitive materials D-10 through D-13.

The fluctuation range of photographic sensitivity depending on the change in the printing temperature and the fluctuation range of photographic sensitivity due to long term storage under the normal condition of the thus obtained coated samples were evaluated for $\Delta D$ (temperature) and $\Delta D$ (aging) by the same procedures as in Example 1. The results are shown in Table 5.

As can be seen from the results, it is possible to obtain photosensitive material with an unexpectedly and remarkably reduced fluctuation range of photographic sensitivity depending on the change in the printing

TABLE 4

| Photosensitive material | Sensitizing dye | Reduction potential of dye | $\Delta D$ (temperature) | $\Delta D$ (aging) | Remarks |
| --- | --- | --- | --- | --- | --- |
| D-1 | (S-1) | −1.245 V | 0.24 | −0.07 | Comparative Example |
| D-2 | (I-3) | −1.290 V | 0.03 | −0.03 | This invention |
| D-3 | (S-2) | −1.140 V | 0.46 | −0.06 | Comparative Example |
| D-4 | (S-3) | −1.245 V | 0.27 | −0.09 | Comparative Example |
| D-5 | (I-5) | −1.270 V | 0.06 | −0.04 | This invention |
| D-6 | (I-8) | −1.300 V | 0.02 | −0.04 | This invention |
| D-7 | (I-18) | −1.290 V | 0.02 | −0.01 | This invention |
| D-8 | (I-22) | −1.290 V | 0.02 | −0.01 | This invention |
| D-9 | (I-40) | −1.340 V | 0.01 | −0.05 | This invention |

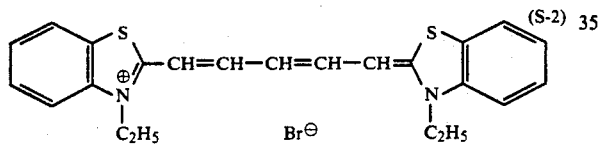

temperature and the fluctuation range of photographic sensitivity due to long term storage under the normal condition by incorporating the nitrogen-containing heterocyclic compound in the silver halide emulsion of high silver chloride content spectrally sensitized with the red sensitizing dye disclosed in the present invention.

TABLE 5

| Photosensitive material | Nitrogen-containing heterocyclic compound | Addition amount (per one mol silver) | $\Delta D$ (temperature) | $\Delta D$ (aging) | Remarks |
| --- | --- | --- | --- | --- | --- |
| D-10 | not added | — | 0.25 | −0.08 | Comparative Example |
| D-11 | (IV-16) | $1 \times 10^{-3}$ mol | 0.06 | −0.04 | This invention |
| D-12 | (IV-30) | $1 \times 10^{-3}$ mol | 0.02 | −0.01 | This invention |
| D-13 | (IV-33) | $1 \times 10^{-3}$ mol | 0.08 | −0.02 | This invention |

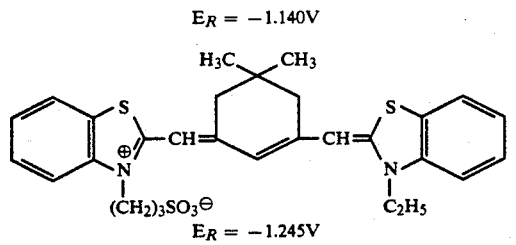

As apparent from the results, the fluctuation range of photographic sensitivity depending on the change in the printing temperature and the fluctuation range of photographic sensitivity due to long term storage under the normal condition can be unexpectedly and remarkably decreased by using the red sensitizing dye having a reduction potential at value of −1.27 V or more negative in combination with the silver halide emulsion of high silver chloride content and the nitrogen-containing heterocyclic compound.

EXAMPLE 4

A multi-layered color printing paper having the layer structure as shown below was prepared on a paper support laminated on both sides thereof with polyethylene (Photosensitive material: D-1M and D-8M).

The coating solution was prepared as below. Preparation of the first coating solution:

To 19.1 g of a yellow coupler (ExY) and 4.4 g of a color image stabilizer (Cpd-1) were added and dissolved 27.2 cc of ethyl acetate and 7.7 cc of a solvent (Solv-1) and the solution was emulsified and dispersed in 185 cc of an aqueous 10% gelatin solution containing 8 cc of 10% sodium dodecylbenzenesulfonate. While on the other hand, a blue sensitizing dye described below was added in an amount of $5.0 \times 10^{-4}$ mol per one mol of silver to a silver bromochloride emulsion (containing 0.5 mol % of silver bromide, 70 g/kg of Ag). The above-mentioned emulsified dispersion and this emulsion were mixed together and dissolved to prepare a coating solution for the first layer so as to provide the composition as shown below. The coating solutions for the second layer through seventh layer were prepared also by the same procedures as in the coating solution for the first layer. Sodium 1-oxy-3,5-dichloro-s-triazone salt was used as the gelatin hardener in each of the layers.

The following compounds were used for the spectral sensitizing dyes for each of the layers.

Blue sensitive emulsion layer ($5.0 \times 10^{-4}$ mol per one mol of silver halide)

Green sensitive emulsion layer

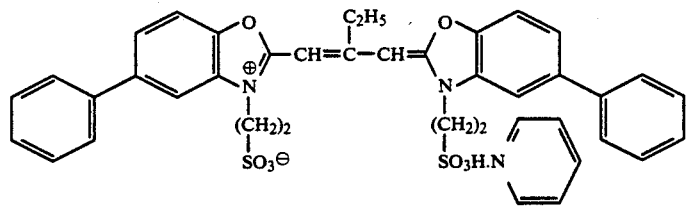

($4.0 \times 10^{-4}$ mol per one mol of silver halide)

Further, 1-(5-methylureidophenyl)-5-mercaptotetrazole was added to the blue sensitive emulsion layer, green sensitive emulsion layer and red sensitive emulsion in amounts of $8.5 \times 10^{-5}$ mol, $7.7 \times 10^{-4}$ mol and $2.5 \times 10^{-4}$ mol, respectively, per one mol of silver halide.

The following dyes were added to the emulsion layers for preventing irradiation.

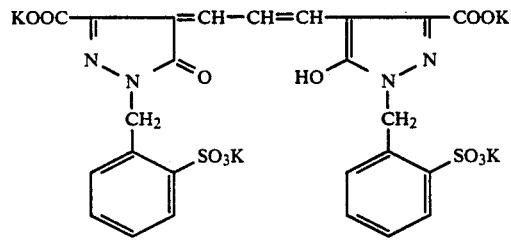

and

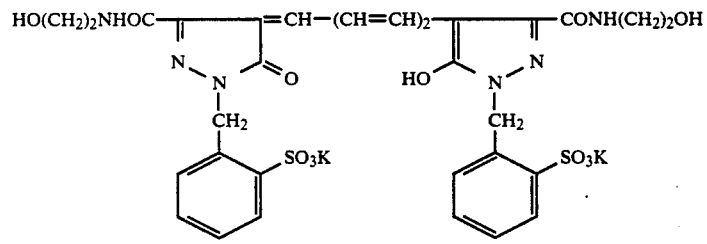

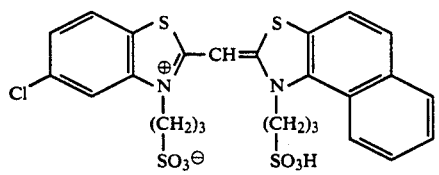

Layer structure

The composition for each of the layers is shown below. Numerical figures represent the coating amount (g/m$^2$). The amount of the silver halide emulsion expressed the coating amount calculated as silver.

Support

Polyethylene laminated paper (Containing white pigment (TiO$_2$) and bluish dye (ultramarine blue) in polyethylene on the side of the first layer).

| First layer (Blue sensitive layer) | |
|---|---|
| Silver halide emulsion (Br: 0.5 mol %) | 0.30 |
| Gelatin | 1.86 |
| Yellow coupler (ExY) | 0.82 |
| Color image stabilizer (Cpd-1) | 0.19 |
| Solvent (Solv-1) | 0.35 |
| Second layer (color mixing preventive layer) | |
| Gelatin | 0.99 |
| Color mixing inhibitor (Cpd-2) | 0.08 |
| Third layer (Green sensitive layer) | |
| Silver halide emulsion (Br: 1 mol %) | 0.36 |
| Gelatin | 1.24 |
| Magenta coupler (ExM) | 0.31 |

| -continued | |
|---|---|
| Color image stabilizer (Cpd-3) | 0.25 |
| Color image stabilizer (Cpd-4) | 0.12 |
| Solvent (Solv-2) | 0.42 |
| *Fourth layer (UV absorption layer)* | |
| Gelatin | 1.58 |
| UV absorber (UV-1) | 0.62 |
| Color mixing inhibitor (Cpd-5) | 0.05 |
| Solvent (Solv-3) | 0.24 |
| *Fifth layer (red sensitive layer)* | |
| Silver halide emulsion (D-1 or D-8) | 0.23 |
| Gelatin | 1.34 |
| Cyan coupler (ExC) | 0.34 |
| Color image stabilizer (Cpd-6) | 0.17 |
| Polymer (Cpd-7) | 0.40 |
| Solvent (Solv-4) | 0.23 |
| *Sixth layer (UV absorption layer)* | |
| Gelatin | 0.53 |
| UV absorber (UV-1) | 0.21 |
| Solvent (Solv-3) | 0.08 |
| *Seventh layer (Protection layer)* | |
| Gelatin | 1.33 |
| Acryl modified polyvinyl alcohol copolymer (modification degree 17%) | 0.17 |
| Liquid paraffin | 0.03 |

(ExY) Yellow coupler

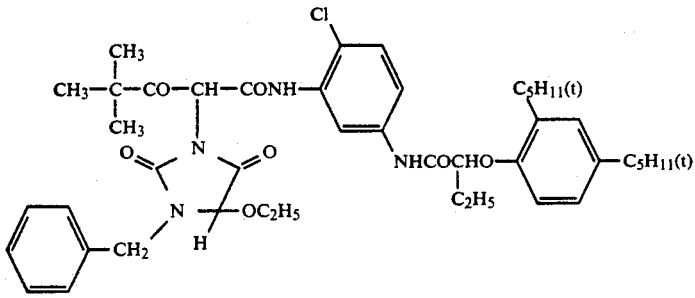

(ExM) Magenta coupler

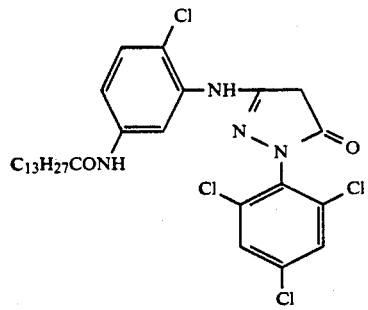

(ExC) Cyan coupler

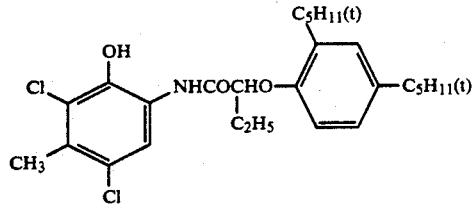

(Cpd-1) Color image stabilizer

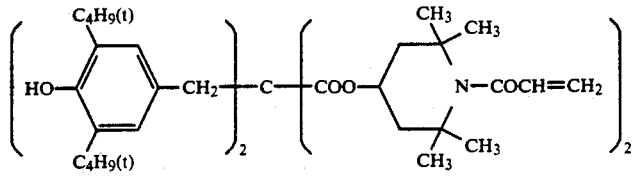

(Cpd-2) Color mixing inhibitor
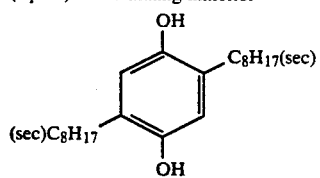
(Cpd-3) Color image stabilizer
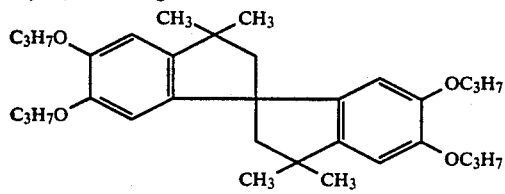
(Cpd-4) Color image stabilizer
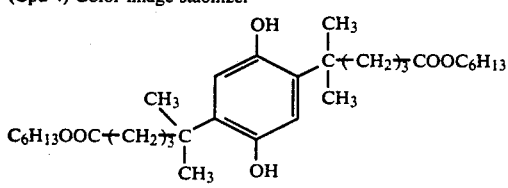
(Cpd-5) Color mixing inhibitor
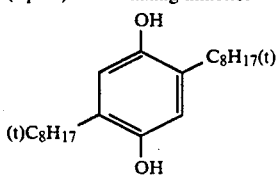
(Cpd-6) Color image stabilizer
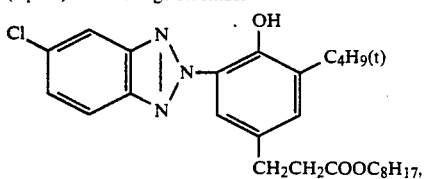
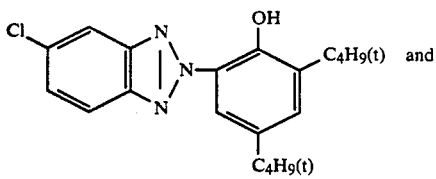 and
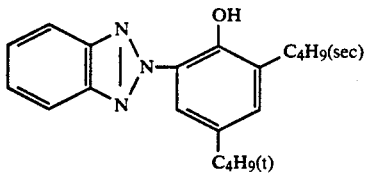
as 5:8:9 mixture (weight ratio)
(Cpd-7) Polymer
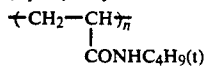
Average molecular weight 80,000

(UV-1) UV absorber

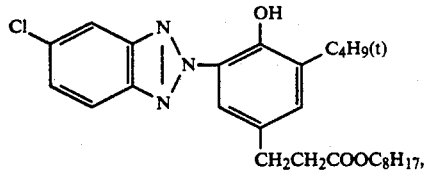 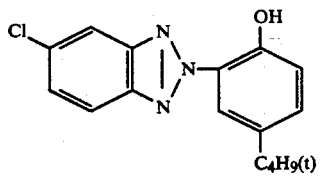

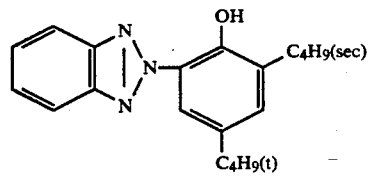

as 2:9:8 mixture (weight ratio)

(Solv-1) Solvent

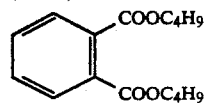

(Solv-2) Solvent

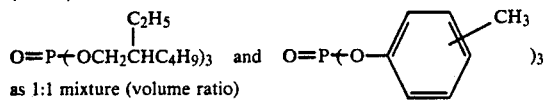

as 1:1 mixture (volume ratio)

(Solv-3) Solvent

O=P(—O—C₉H₁₉(iso))₃

(Solv-4) Solvent

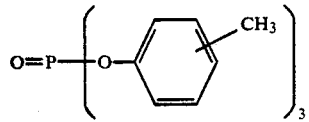

| Processing step | Temperature | Time |
|---|---|---|
| Color development | 35° C. | 45 sec |
| Bleach-Fixing | 30–36° C. | 45 sec |
| Stabilizing (1) | 30–37° C. | 20 sec |
| Stabilizing (2) | 30–37° C. | 20 sec |
| Stabilizing (3) | 30–37° C. | 20 sec |
| Stabilizing (4) | 30–37° C. | 30 sec |
| Drying | 70–85° C. | 60 sec |

(4-vessel countercurrent system from stabilizing (4) to (1) was employed)

The composition for each of the processing solutions is as follows.

| Color developer | |
|---|---|
| Water | 800 ml |
| Ethylenediaminetetraacetic acid | 2.0 g |
| Triethanolamine | 8.0 g |
| Sodium chloride | 1.4 g |
| Potassium carbonate | 25.0 g |
| N-ethyl-N-(β-methanesulfonamidoethyl)-3-methyl-4-aminoaniline sulfate | 5.0 g |
| N,N-diethylhydroxylamine | 4.2 g |
| 5,6-dihydroxybenzene-1,2,4-trisulfonic acid | 0.3 g |
| Brightening agent (4,4'-diaminostilbene) | 2.0 g |
| made up with water to | 1000 ml |
| pH | 10.10 |

| Bleach-fixing solution | |
|---|---|
| Water | 400 ml |
| Ammonium thiosulfate (70%) | 100 ml |
| Sodium sulfite | 18 g |
| Ammonium ethylenediaminetetraacetato ferrate | 55 g |
| Disodium ethylenediaminetetraacetate | 3 g |
| Glacial acetic acid | 8 g |
| made up with water to | 1000 ml |
| pH | 5.5 |
| Stabilizing solution | |
| Formalin (37%) | 0.1 g |
| Formalin-sulfuric acid adduct | 0.7 g |
| 5-chloro-2-methyl-4-isothiazolin-3-one | 0.02 g |
| 2-methyl-4-isothiazolin-3-one | 0.01 g |
| Copper sulfate | 0.005 g |
| made up with water to: | 1000 ml |
| pH | 4.0 |

TABLE 6

| Photosensitive material | Emulsion in red sensitive layer | Sensitizing dye in red sensitive layer | ΔD (temperature) | ΔD (aging) | Remarks |
|---|---|---|---|---|---|
| D-1M | D-1 | (S-1) | 0.20 | −0.06 | Comparative Example |
| D-8M | D-8 | (I-22) | 0.01 | −0.01 | This invention |

The fluctuation range of photographic sensitivity depending on the change in the printing temperature and fluctuation range of photographic sensitivity due to long term storage under the normal condition of the thus obtained coated were evaluated for ΔD (temperature) and ΔD (aging) by the same procedures as in Example 1. The results are shown in Table 6.

As can be apparent from the results, it is shown that the silver halide emulsion of high silver chloride content containing the red sensitizing dye and the nitrogen-containing heterocyclic compound disclosed by the present invention has an unexpectedly and remarkably reduced fluctuation range of photographic sensitivity depending on the change in the printing temperature and fluctuation range of photographic sensitivity due to long term storage under the normal condition also in the multi-layered color printing paper system.

EXAMPLE 5

The same coated sample as in Example 4 was prepared except for replacing the composition for the third layer of the multi-layered color photosensitive material as described below.

| Third layer (Green sensitive layer) | |
|---|---|
| Silver halide emulsion | 0.16 |
| Gelatin | 1.80 |
| Magenta coupler (ExM1) | 0.35 |
| Color image stabilizer (Cpd-3) | 0.20 |
| Solvent (Solv-5) | 0.65 |

(ExM1) Magenta coupler

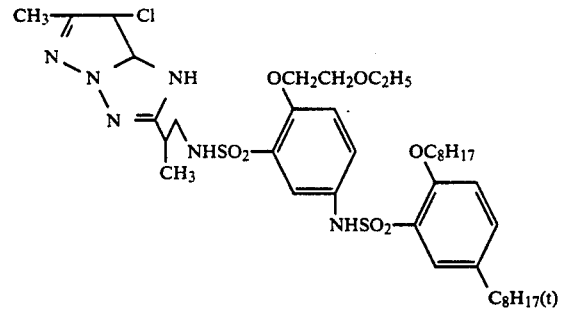

(Solv-5) Solvent

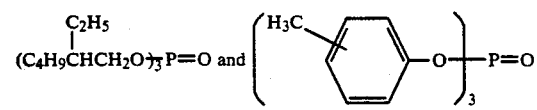

as 2:1 mixture (weight ratio)

The same test as in Example 4 was conducted which confirmed similar effects.

EXAMPLE 6

Coated samples were prepared in the same manner as in Example 4 except for using 1,2-bis-(vinylsulfonyl)ethane as the gelatin hardener for each of the layers in the multi-layered color photosensitive material.

The same tests as in Example 4 were conducted which confirmed similar effects.

By using the silver halide emulsion of high silver chloride content containing the red sensitizing dye and the nitrogen-containing heterocyclic compound in accordance with the present invention, the fluctuation range of photographic sensitivity depending on the change in the printing temperature and the fluctuation range of photographic sensitivity due to long term storage under the normal condition can remarkably be reduced.

While the invention has been described in detail and with reference to specific embodiments thereof, it will be apparent to one skilled in the art that various changes and modifications can be made therein without departing from the spirit and scope thereof.

What is claimed is:

1. A silver halide photographic material having, on a support, at least one red sensitive emulsion layer which comprises (a) a silver halide emulsion comprising silver halide grains wherein the silver halide grains are silver chloride, or silver bromochloride containing substantially no silver iodide in which 95 mol % or more of the entire silver halide constituting the silver halide grains is silver chloride, and spectrally sensitized by a red sensitizing dye having a reduction potential at a value of −1.27 (V vs SCE) or more negative and having the general formula:

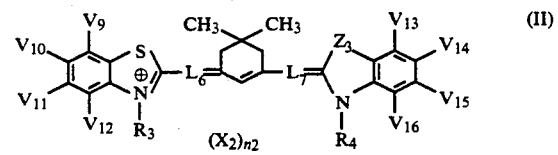

wherein $Z_3$ represent an oxygen or sulfur atom;

$L_6$ and $L_7$ each represents a methine group;

$R_3$ and $R_4$ each represent an alkyl group, provided that $R_3$ and $L_6$ and/or $R_4$ and $L_7$ may be bonded to each other to form a 5- or 6-membered carbocyclic ring;

$V_9$, $V_{10}$, $V_{11}$, $V_{12}$, $V_{13}$, $V_{14}$, $V_{15}$ and $V_{16}$, each represents a hydrogen atom, a halogen atom, an alkyl group, an acyl group, an acyloxy group, an alkoxycarbonyl group, a carbamoyl group, a sulfamoyl group, a carboxy group, a cyano group, a hydroxy group, an amino group, an acylamino group, an alkoxy group, an alkylthio group, an alkylsulfonyl group, a sulfonic acid group, an aryloxy group, or an aryl group, wherein the respective Hammett's values of $V_9$–$V_{16}$ have a sum of −0.08 or more negative when $Z_3$ is an oxygen atom and the sum is −0.15 or more negative when $Z_3$ is a sulfur atom; and ($X_2$) represents a charged ion; and $n_2$ represents a value of 0 or greater required to neutralize an electric charge of said dye, and (b) an azole compound containing a mercapto group.

2. A silver halide photographic material according to claim 1, wherein said reduction potential is −1.285 or more negative.

3. A silver halide photographic material according to claim 1, wherein said dye is present in said red-sensitive emulsion layer in an amount from about $4 \times 10^{-6}$ to $8 \times 10^{-3}$ mol per mol of silver halide present in said layer.

4. A silver halide photographic material according to claim 1, wherein azole compound is present in said layer in an amount from $1 \times 10^{-5}$ to $4 \times 10^{-2}$ mol per mol of silver in said layer.

5. A silver halide photographic material according to claim 1, wherein the sum is −0.15 or more negative when $Z_3$ is an oxygen atom and the sum is −0.30 or more negative when $Z_3$ is a sulfur atom.

6. A silver halide photographic material according to claim 1, wherein the sum of said respective Hammett's values $V_9$–$V_{16}$ is from −0.90 to −0.17 when $Z_3$ is an oxygen atom and the sum is from −1.05 to −0.34 when $Z_3$ is a sulfur atom.

7. A silver halide photographic material according to claim 1, wherein the silver halide grains in the red-sensitive silver halide emulsion is silver chloride, or silver bromochloride containing substantially no silver iodide in which 97 mol % or more of the entire silver halide constituting silver halide grains is silver chloride.

8. A silver halide photographic material according to claim 1, wherein the halogen composition of the silver halide grains in the silver halide emulsion is silver bromochloride containing substantially no silver iodide in which 95 mol % or more of the entire silver halide constituting the halide grains is silver chloride, and the silver halide grains have a localized phase in which the silver bromide content exceeds at least 20 mol % at the surface or in the inside thereof.

9. A silver halide photographic material according to claim 8, wherein the localized phase is present as surrounding the silver halide grain at its surface or in its inside, or as core.

10. A silver halide photographic material according to claim 8, wherein the localized phase constitutes a layered structure at the surface or in the inside of the silver halide grain.

11. A silver halide photographic material according to claim 8, wherein the localized phase is isolated at the surface or in the inside of the silver halide grain.

12. A silver halide photographic material according to claim 8, wherein the localized phase is epitaxially grown locally at the surface of the silver halide grains.

13. A silver halide photographic material according to claim 8, wherein the silver bromide content of the localized phase is up to 60 mol %.

14. A silver halide photographic material according to claim 13 wherein the silver bromide content of the localized phase is within a range from 30 to 50 mol %.

15. A silver halide photographic material according to claim 1, wherein the silver halide emulsion is spectrally sensitized by the red sensitizing dye and a compound represented by formula (VII), with said compound being present in an amount required for supersensitization:

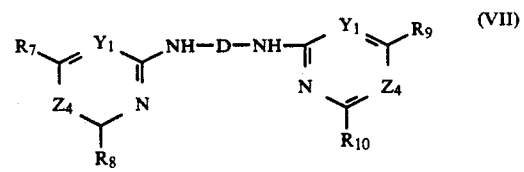

wherein D represents a divalent aromatic residue, $R_7$, $R_8$, $R_9$ and $R_{10}$ each represents a hydrogen atom, a hydroxy group, an alkoxy group, an aryloxy group, a halogen atom, a heterocyclic group, a mercapto group, an alkylthio group, an arylthio group, a heterocyclicthio group, an amino group, an alkylamino group, a cyclohexylamino group, an arylamino group, a heterocyclic amino group, an aralkylamino group or an aryl group, and $Y_1$ and $Z_4$ each represents —N= or —CH= provided that at least one of them is —N= .

16. A silver halide photographic material according to claim 1, wherein silver chlorobromide grains in the silver halide emulsion comprise a silver bromide localized phase which is formed by adding silver bromide fine grains or silver chlorobromide fine grains.

* * * * *